(12) United States Patent
Hamaguchi et al.

(10) Patent No.: US 7,614,228 B2
(45) Date of Patent: Nov. 10, 2009

(54) SYSTEM AND METHOD OF MANUFACTURING ACTUATOR

(75) Inventors: Kouji Hamaguchi, Osaka (JP); Junichi Tanii, Izumi (JP); Akira Kosaka, Yao (JP)

(73) Assignee: Konica Minolta Holdings, Inc., Tokyo (JP)

( * ) Notice: Subject to any disclaimer, the term of this patent is extended or adjusted under 35 U.S.C. 154(b) by 414 days.

(21) Appl. No.: 11/604,916

(22) Filed: Nov. 28, 2006

(65) Prior Publication Data

US 2007/0137196 A1  Jun. 21, 2007

(30) Foreign Application Priority Data

Dec. 15, 2005 (JP) .............................. 2005-361640

(51) Int. Cl.
*F01B 29/10* (2006.01)

(52) U.S. Cl. ...................... 60/527; 310/306; 310/307; 29/446

(58) Field of Classification Search ........... 60/527–529; 310/306–307; 29/446
See application file for complete search history.

(56) References Cited

U.S. PATENT DOCUMENTS 5,836,066 A * 11/1998 Ingram ...................... 29/90.7
6,588,208 B1 * 7/2003 Clements ..................... 60/527
6,889,411 B2 * 5/2005 Hinkley et al. ................. 29/11

FOREIGN PATENT DOCUMENTS

JP          10-160997 A      6/1998

* cited by examiner

Primary Examiner—Hoang M Nguyen
(74) Attorney, Agent, or Firm—Sidley Austin LLP

(57) ABSTRACT

A system of manufacturing an actuator for driving a to-be-driven object by extension/contraction of a shape memory alloy, the system comprising: a mounting unit configured to mount the shape memory alloy between an actuator body and the to-be-driven object; and a heater configured to heat the shape memory alloy mounted by the mounting unit on a mounting path between the actuator body and the to-be-driven object to a predetermined temperature range.

24 Claims, 20 Drawing Sheets

500(500B)

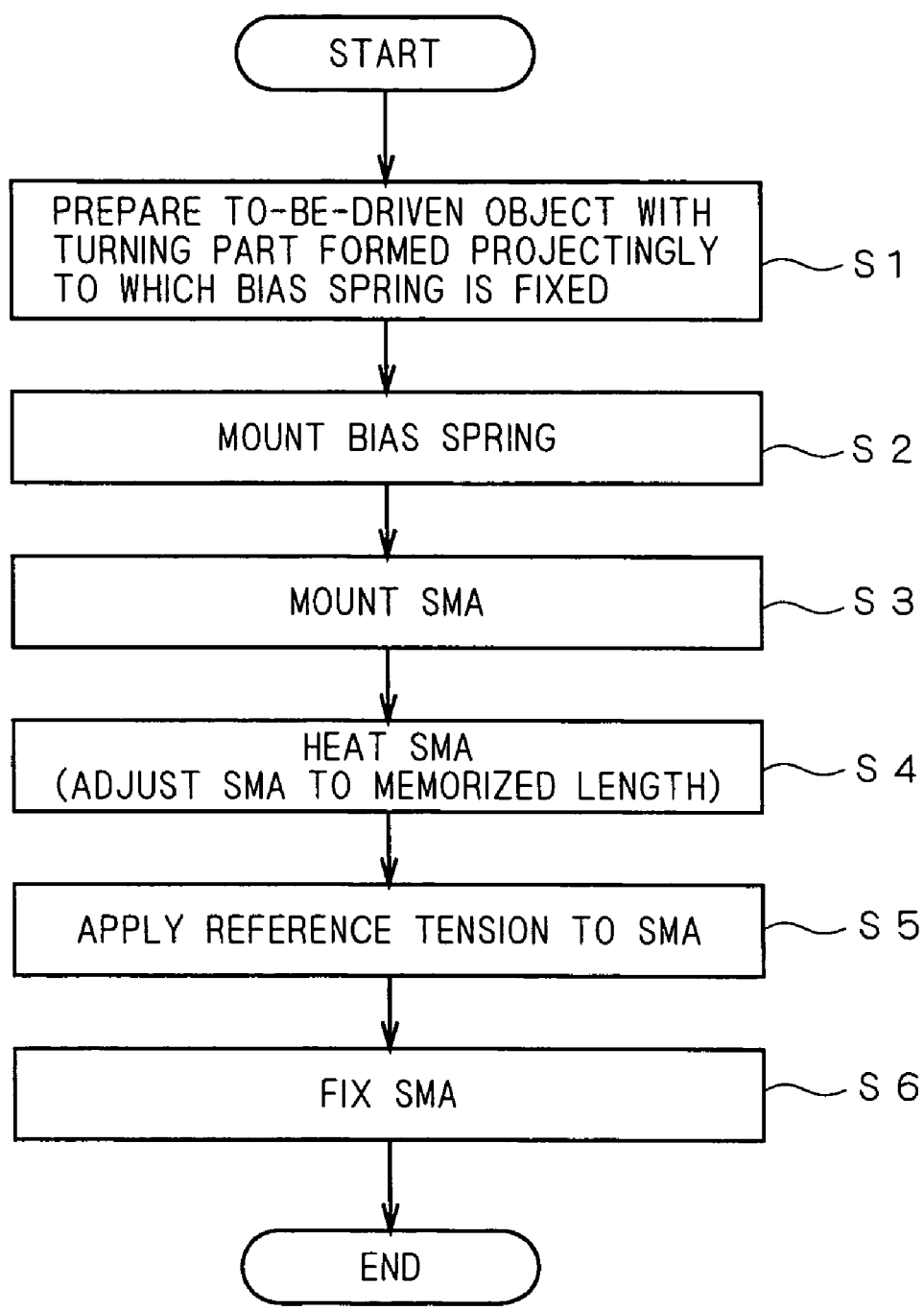

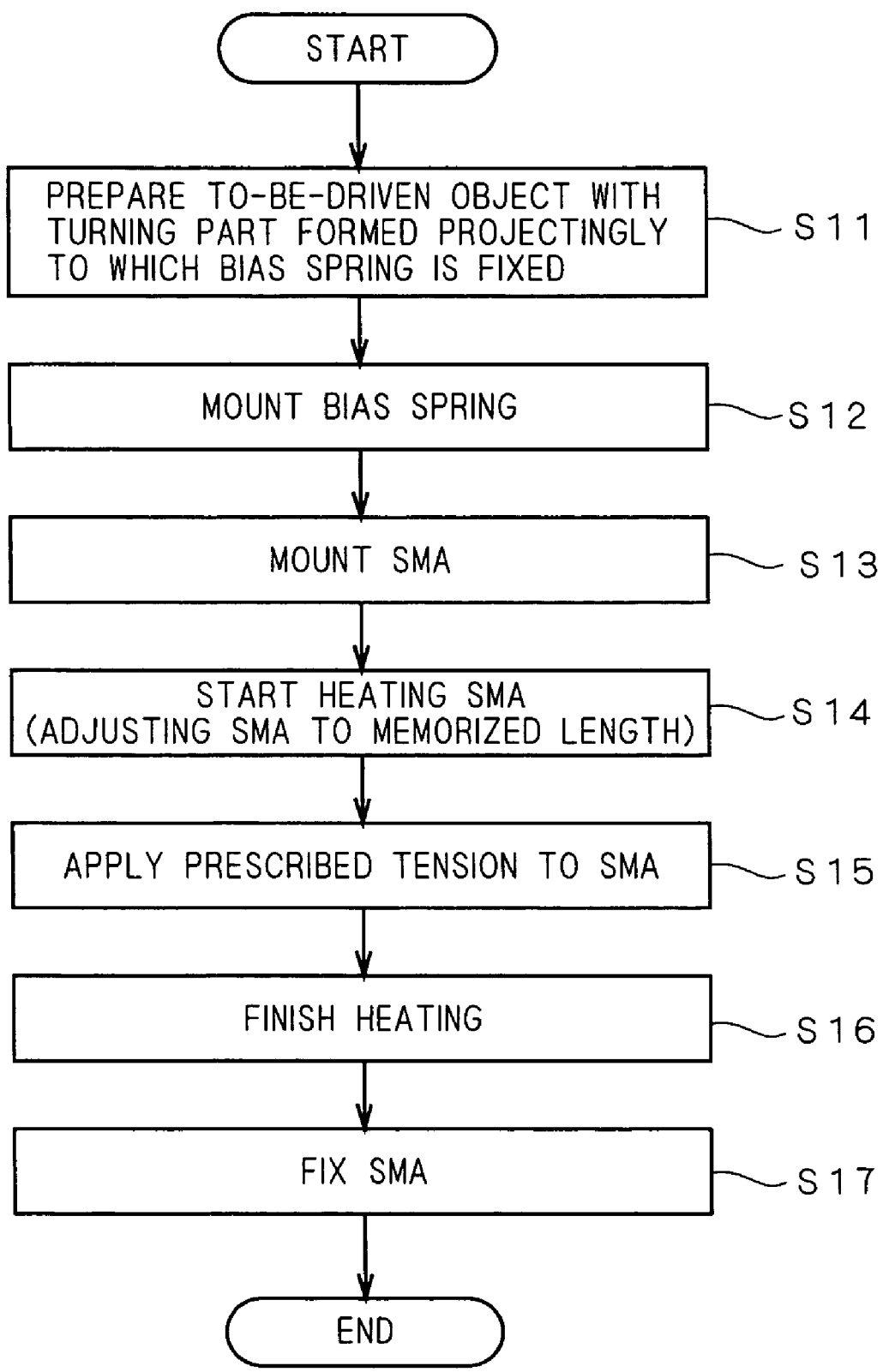

F I G . 1 2
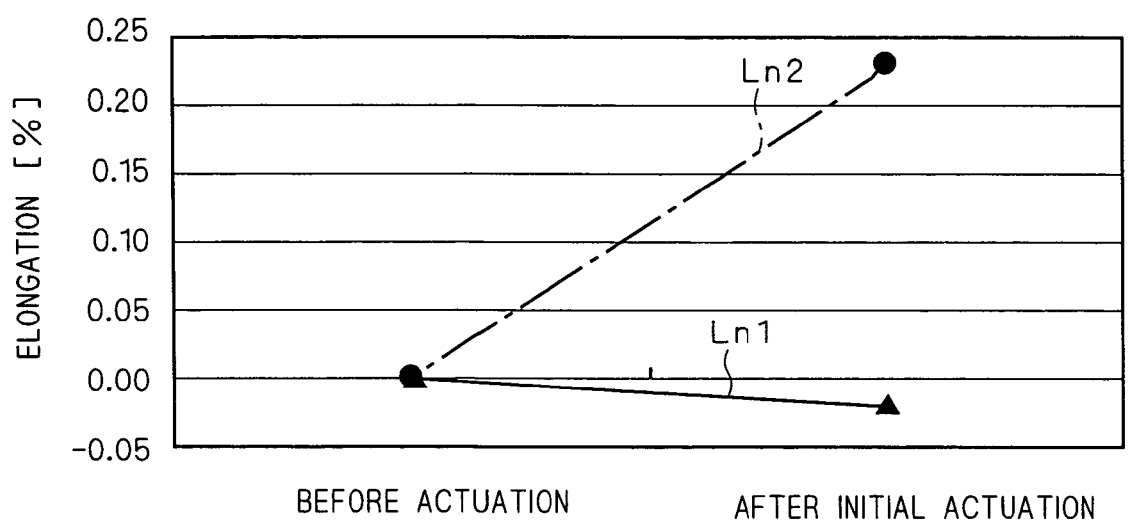

F I G. 1 5
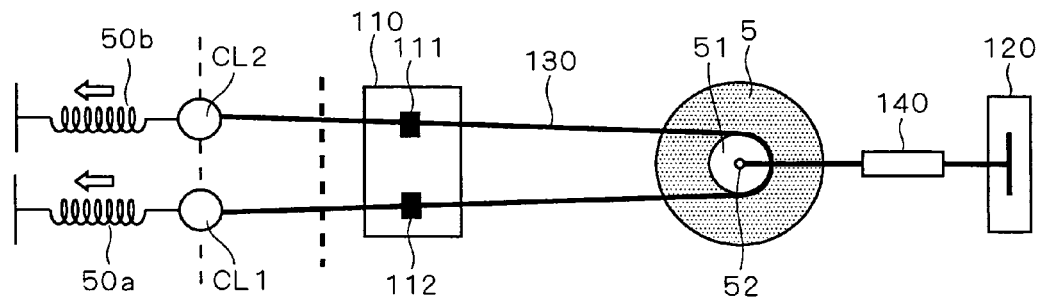
F I G. 1 6
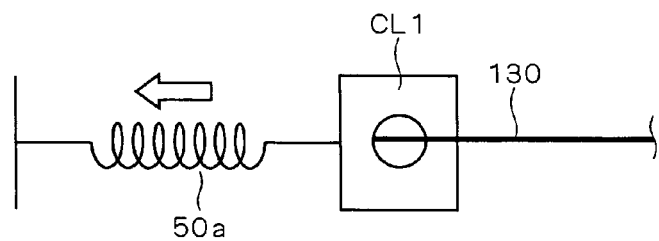
F I G. 1 7
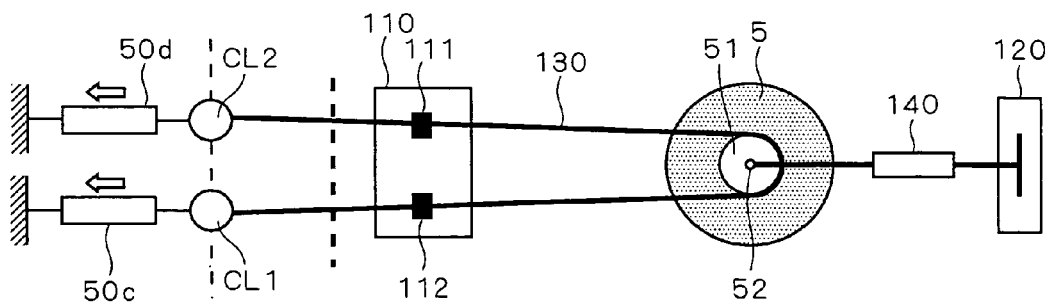

SYSTEM AND METHOD OF MANUFACTURING ACTUATOR

This application is based on application No. JP2005-361640 filed in Japan, the contents of which are hereby incorporated by reference.

BACKGROUND OF THE INVENTION

1. Field of the Invention

The present invention relates to an actuator for driving a to-be-driven object with the help of extension/contraction of a shape memory alloy.

2. Description of the Background Art

An actuator is known which drives a to-be-driven object by extension/contraction of a shape memory alloy (SMA) wire or foil, or the like. In manufacturing such an actuator, the initial state in which SMA is mounted is examined, where the initial position of a to-be-driven object in the actuator problematically varies due to variations in tension control when mounting the SMA, tension variations resulting from the state of how the SMA is mounted, and the like.

To overcome such drawbacks, an actuator provided with an adjusting mechanism for adjusting the initial position of a to-be-driven object has been presented (e.g., Japanese Patent Application Laid-Open No. 10-160997 (1999)).

By the technique presented in JP10-160997, however, elongation of SMA is not stable due to tension variations at mounting. Under such condition, even by applying a predetermined tension to SMA so as to adjust the tension applied thereto, the tension on SMA varies at extension/contraction caused by the initial heating and cooling, which in turn displaces the initial position of a to-be-driven object.

SUMMARY OF THE INVENTION

The present invention is directed to a system of manufacturing an actuator for driving a to-be-driven object by extension/contraction of a shape memory alloy.

The system comprises: a mounting unit configured to mount the shape memory alloy between an actuator body and the to-be-driven object; and a heater configured to heat the shape memory alloy mounted by the mounting unit on a mounting path between the actuator body and the to-be-driven object to a predetermined temperature range.

Tension variations that occur in the shape memory alloy at mounting are relieved, which prevents the initial position of the to-be-driven object from being displaced.

The present invention is also directed to a method of manufacturing an actuator for driving a to-be-driven object by extension/contraction of a shape memory alloy.

It is therefore an object of the present invention to provide a technique for preventing the initial position of a to-be-driven object from being displaced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flow chart showing a manufacturing flow of the actuator;

FIG. 11 is a flow chart showing a manufacturing flow of an actuator;

FIG. 12 is a diagram showing a specific example of changes in elongation of SMA caused by initial actuation;

FIGS. 15 to 17, 18A to 18C and 19 are diagrams each showing a variation of structure which applies tensile stress to SMA;

DESCRIPTION OF THE PREFERRED EMBODIMENTS

Preferred embodiments of the present invention will be described based on the accompanied drawings.

First Preferred Embodiment

Figure 1:
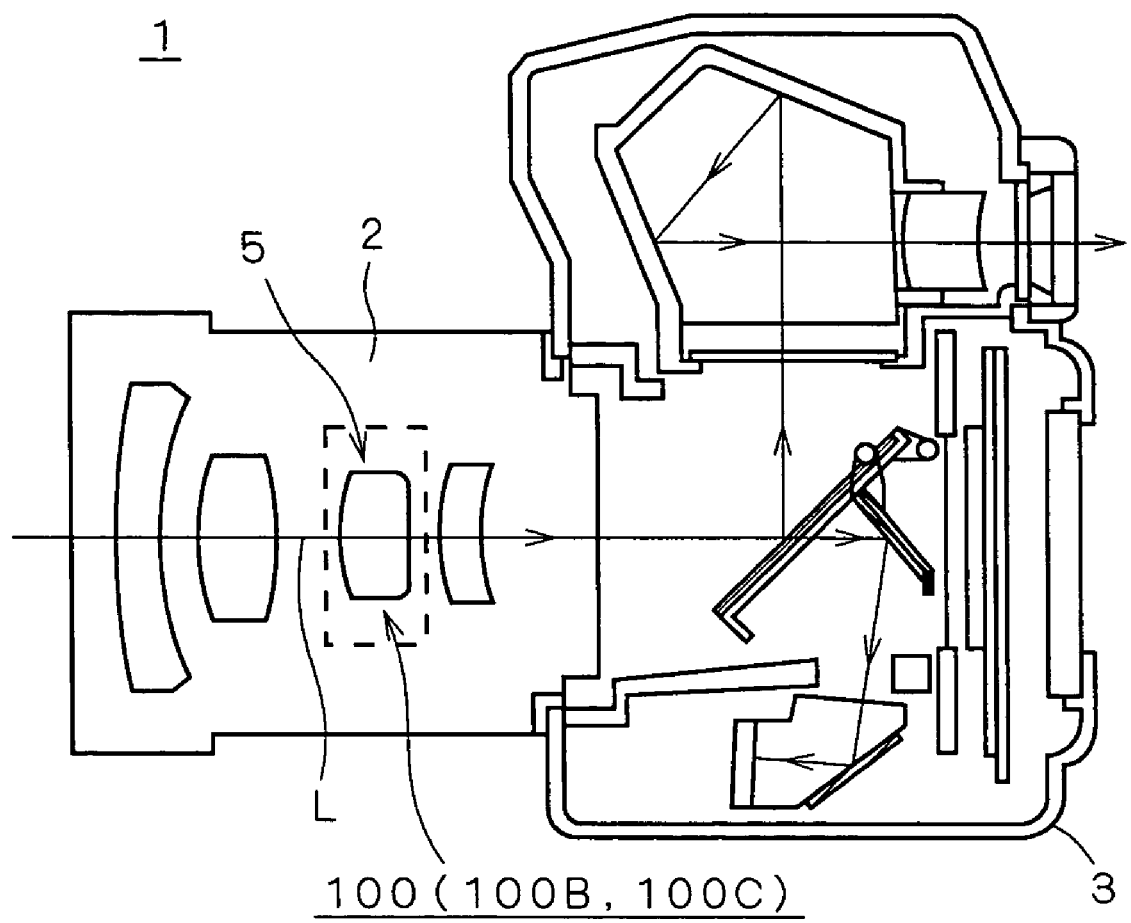
FIG. 1 is a schematic sectional view showing an outline structure of an image capturing apparatus according to preferred embodiments of the present invention.

In an actuator using a shape memory alloy (SMA), the crystal structure of SMA is transformed between relatively soft and hard states by phase transformation between martensite and austenite, so that an actuation is made. SMA, under tension in the soft state with relatively small elastic modulus, extends by several percent of the entire length at most. When being heated in this state to increase the elastic modulus to a relatively large value, SMA has a property of returning to its original length. FIG. 1 shows an image capturing apparatus 1 with an actuator mounted thereon which utilizes this property.

Outline Structure of Image Capturing Apparatus

FIG. 1 is a schematic sectional view showing an outline structure of the image capturing apparatus 1 according to the preferred embodiments of the present invention.

As shown in FIG. 1, the image capturing apparatus 1 is configured to guide light from a subject to an image capturing apparatus body 3 through an image capturing lens unit 2 such that a captured image of the subject is obtained. A lens group composed of a plurality of image capturing lens elements is arranged on an optical axis L of the image capturing lens unit 2.

The image capturing apparatus body 3 is provided with a hand-shake detecting unit (not shown) such as a gyroscope mechanism for detecting the direction and amount of movement of the image capturing apparatus 1 caused by hand shake. An actuator 100 is mounted which drives a hand-shake-correction image capturing lens element or to-be-driven object 5 as appropriate according to the detection by the hand-shake detecting unit for hand shake compensation.

Structure of Actuator

Figure 2A:
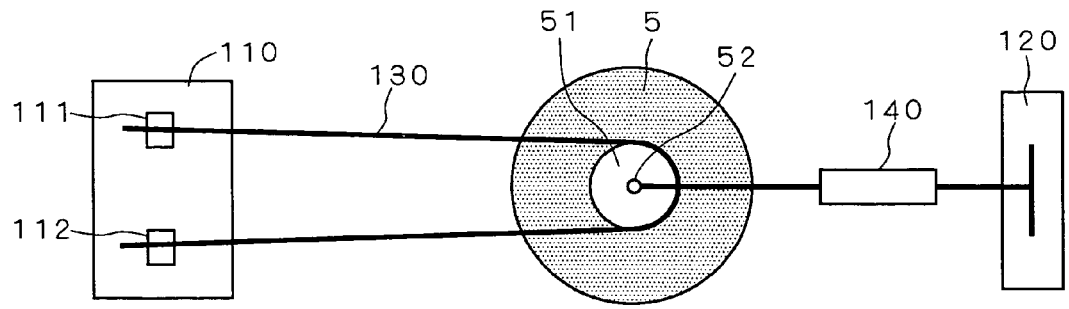
FIGS. 2A to 2C are plan views each showing an outline structure of a bias-spring type actuator.
Figure 2B:
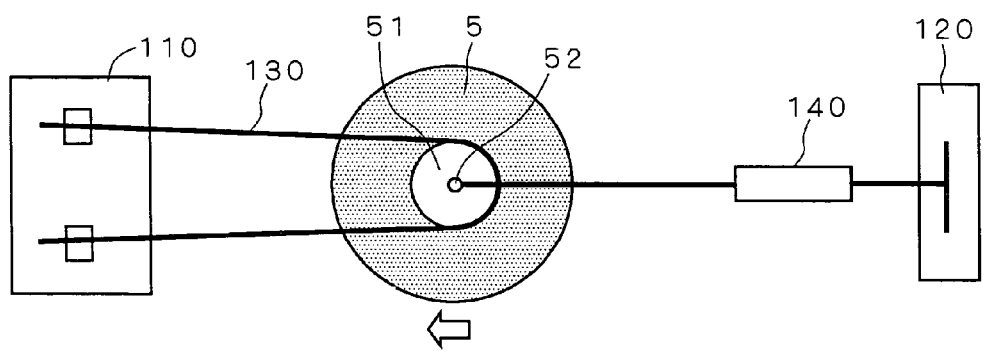
Figure 2C:
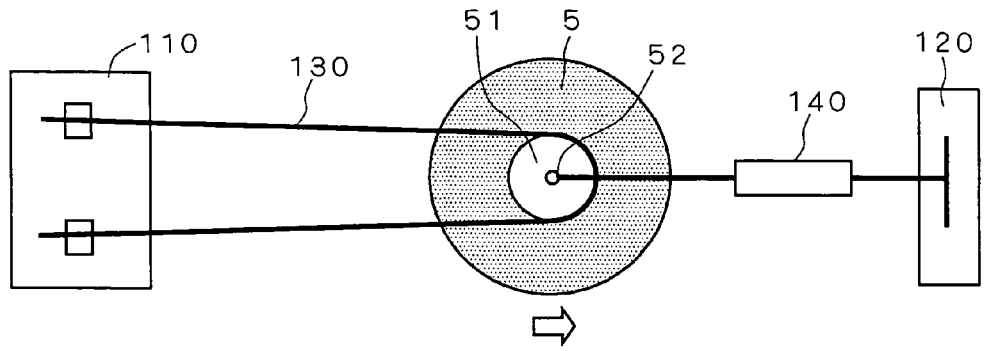

FIGS. 2A to 2C are plan views each showing an outline structure of the actuator 100 according to the first preferred embodiment.

As shown in FIGS. 2A to 2C, the actuator 100 is a bias-spring type actuator including first and second fixing members 110, 120, the to-be-driven object 5, a shape memory alloy (SMA) wire 130 and an elastic-force applying member 140.

The to-be-driven object 5 is held freely slidable by the body of the image capturing lens unit 2, for example. The to-be-driven object 5 has a boss-like (cylindrical) turning part (engaging part) 51 provided projectingly on the hand-shake-correction image capturing lens element which is a main object to be driven.

The first and second fixing members 110 and 120 are intended to fix the actuator 100 to the image capturing lens unit 2 included in the image capturing apparatus 1.

The SMA wire 130 functions as a primary drive for driving the to-be-driven object 5. The SMA wire 130 has its one end fixed to the first fixing member 110 by a first attaching member 111 which also serves as one electrode and the other end fixed to the first fixing member 110 by a second attaching member 112 which also serves as the other electrode while being hooked over the turning part 51 in such a manner as to turn almost halfway round near the middle in its lengthwise direction. In other words, the SMA wire 130 is mounted between the first fixing member 110 and to-be-driven object 5.

Figure 3A:
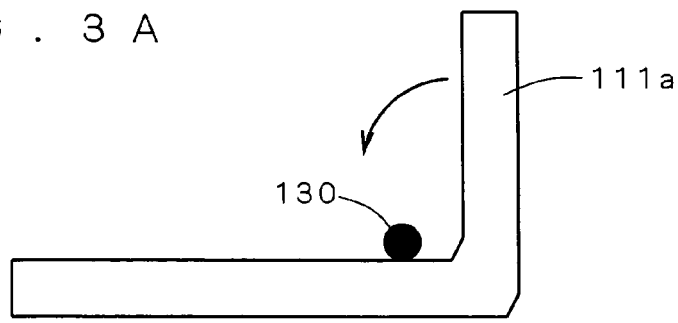
FIGS. 3A and 3B are diagrams each showing a method of fixing SMA.
Figure 3B:
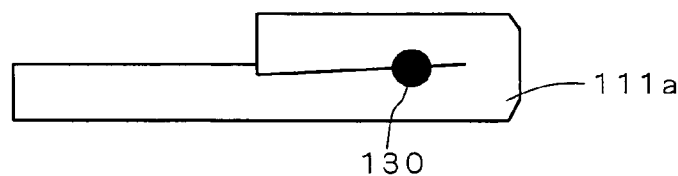
Figure 4A:
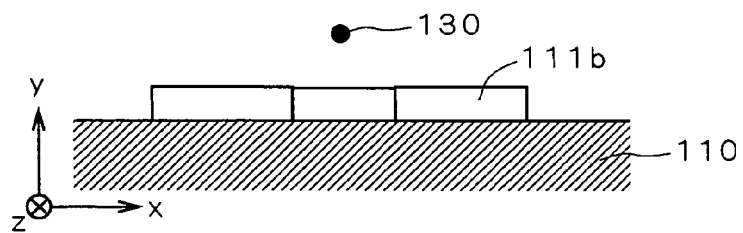
FIGS. 4A to 4C are diagrams each showing a variation of the method of fixing SMA.
Figure 4B:
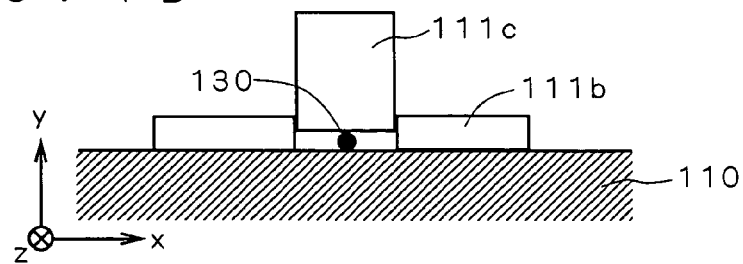
Figure 4C:
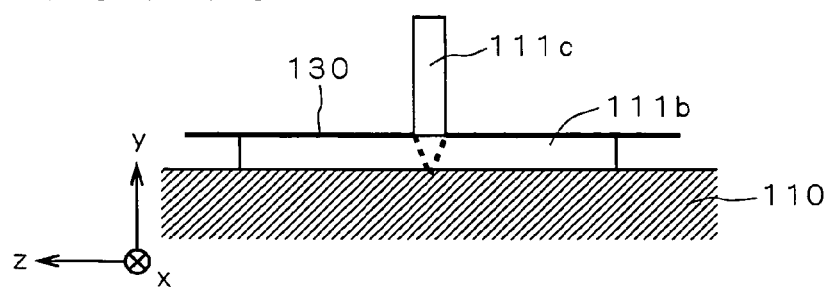

The first and second attaching members 111 and 112 may have a swaging member 111a as shown in FIG. 3A, respectively. In this case, as shown in FIG. 3B, the swaging member 111a is bent to sandwich the SMA wire 130 to fix the SMA wire 130 to the first fixing member 110 by swaging. Alternatively, the first and second attaching members 111 and 112 may have a press-fit fixing member 111b shown in FIG. 4A and a press-fit pin 111c as shown in FIG. 4B. In this case, the SMA wire 130 is inserted into a hole of the press-fit fixing member 111b and pressed by the press-fit pin 111c to be sandwiched between the press-fit pin 111c and press-fit fixing member 111b, so that the SMA wire 130 is fixed to the first fixing member 110 by press fit, as shown in the sectional view of FIG. 4C. In this manner, the SMA wire 130 can be fixed with high accuracy by swaging or press fitting.

The SMA wire 130 is adapted to memorize a desired shape (i.e., memorized length) at a predetermined temperature for memorizing the shape (hereinafter also referred to as "a shape memory temperature"). The "shape memory temperature" is several hundreds degree Celsius in general.

Further, the SMA wire 130 extends and contracts lengthwise with its crystal structure being transformed between martensite and austenite by electric heating and cooling under control of a control circuit not shown.

The elastic-force applying member 140 is constructed of an elastic member such as a spring (e.g., coil spring), with its one end fixed to the second fixing member 120 and the other end fixed to the turning part 51 by an attaching member 52. The elastic-force applying member 140 is arranged so as to apply tension to the to-be-driven object 5 in an almost opposite direction to the tension of the SMA wire 130 itself. In other words, the elastic-force applying member 140 is mounted between the second fixing member 120 and to-be-driven object 5 to apply force to the SMA wire 130 through the to-be-driven object 5.

Accordingly, in a non-operating status, the to-be-driven object 5 stops at a position (reference position) where the tensile force of the SMA wire 130 and the tension of the elastic-force applying member 140 on the to-be-driven object 5 are equalized.

The actuation by the actuator 100 will now be described with reference to FIGS. 2A to 2C.

FIG. 2A shows the state in which the SMA wire 130 has a relatively low elastic modulus and extends under a predetermined tension by the elastic-force applying member 140.

Applying current to the SMA wire 130 from the first attaching member 111 to the second attaching member 112 in the state shown in FIG. 2A, the SMA wire 130 produces Joule heat by its own resistivity. The produced heat causes the SMA wire 130 to undergo a phase transformation, so that its elastic modulus is increased to be relatively high. Then, the SMA wire 130 contracts lengthwise to try to recover to the memorized length (original state). At this time, the contracting force of the SMA wire 130 counteracts the predetermined tension applied to the to-be-driven object 5 by the elastic-force applying member 140. As a result, the to-be-driven object 5 is driven toward the first fixing member 110 (to the left in the drawing). FIG. 2B shows the state in which the to-be-driven object 5 has been driven toward the first fixing member 110.

Stopping the current applied to the SMA wire 130 in the state shown in FIG. 2B, the SMA wire 130 undergoes a phase transformation by cooling caused by heat radiation, so that its elastic modulus is decreased to be relatively low. Then, a predetermined tension is applied to the SMA wire 130 by the elastic-force applying member 140 to cause the SMA wire 130 to extend. At this time, the to-be-driven object 5 is driven toward the second fixing member 120. FIG. 2C shows the state in which the to-be-driven object 5 has been driven toward the second fixing member 120. The states shown in FIGS. 2A and 2C are equivalent to each other.

As described above, the actuator 100 carries out its function by appropriately repeating actuations of driving the to-be-driven object 5 to the left and right in FIGS. 2A to 2C making use of extension/contraction of the SMA wire 130 caused by heating and cooling.

Manufacturing System

Figure 5:
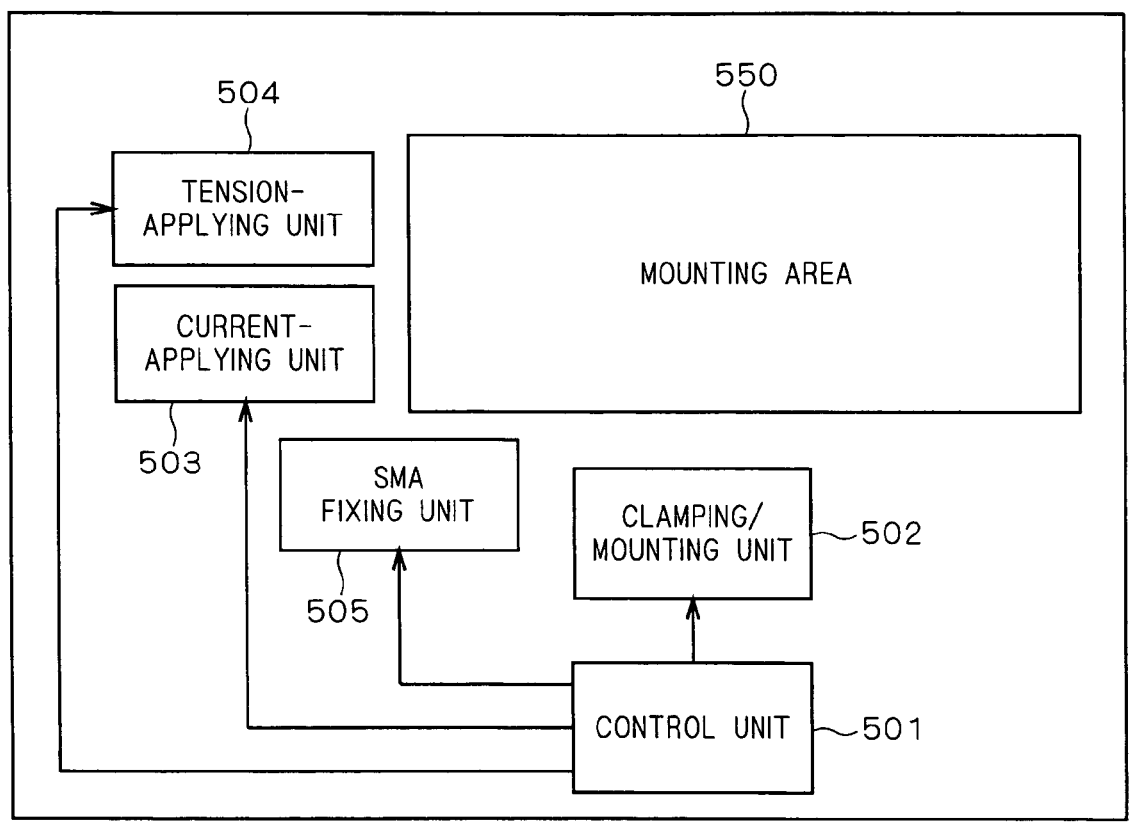
FIG. 5 is a diagram illustrating the configuration of a system of manufacturing the actuator.

FIG. 5 is a block diagram illustrating the configuration of a manufacturing system 500 for manufacturing the actuator 100.

The manufacturing system 500 mainly includes a control unit 501, a clamping/mounting unit 502, a current-applying unit 503, a tension-applying unit 504 and an SMA fixing unit 505. With this manufacturing system 500, when the image capturing lens unit 2 without the elastic-force applying member 140, to-be-driven object 5 and SMA wire 130 being attached thereto is mounted on a mounting area 550, for example, the elastic-force applying member 140 and to-be-driven object 5 are attached while the SMA wire 130 is mounted. The actuator 100 is thereby completed.

FIG. 5 focuses on the functions of the manufacturing system 500 related to mounting and fixing of the SMA wire 130, among others. Hereinafter, an actuator yet to be completed as the actuator 100, more specifically, an actuator without the elastic-force applying member 140, to-be-driven object 5 and SMA wire 130 being attached thereto will also be called "an actuator body".

The control unit 501 contains therein CPU, RAM, ROM and the like, and causes the CPU to read and execute programs stored in the ROM, for example, to thereby control the whole operation of the manufacturing system 500.

The clamping/mounting unit 502 mounts the SMA wire 130 on the actuator body in response to a signal from the control unit 501. More specifically, in the state where the elastic-force applying member 140 with its one end fixed to the to-be-driven object 5 by the attaching member 52 is fixed to the second fixing member 120, the SMA wire 130 is hooked over the turning part 51 from above the first attaching member 111 to be mounted on a path leading to the second attaching member 112 (mounting path).

Figure 6:
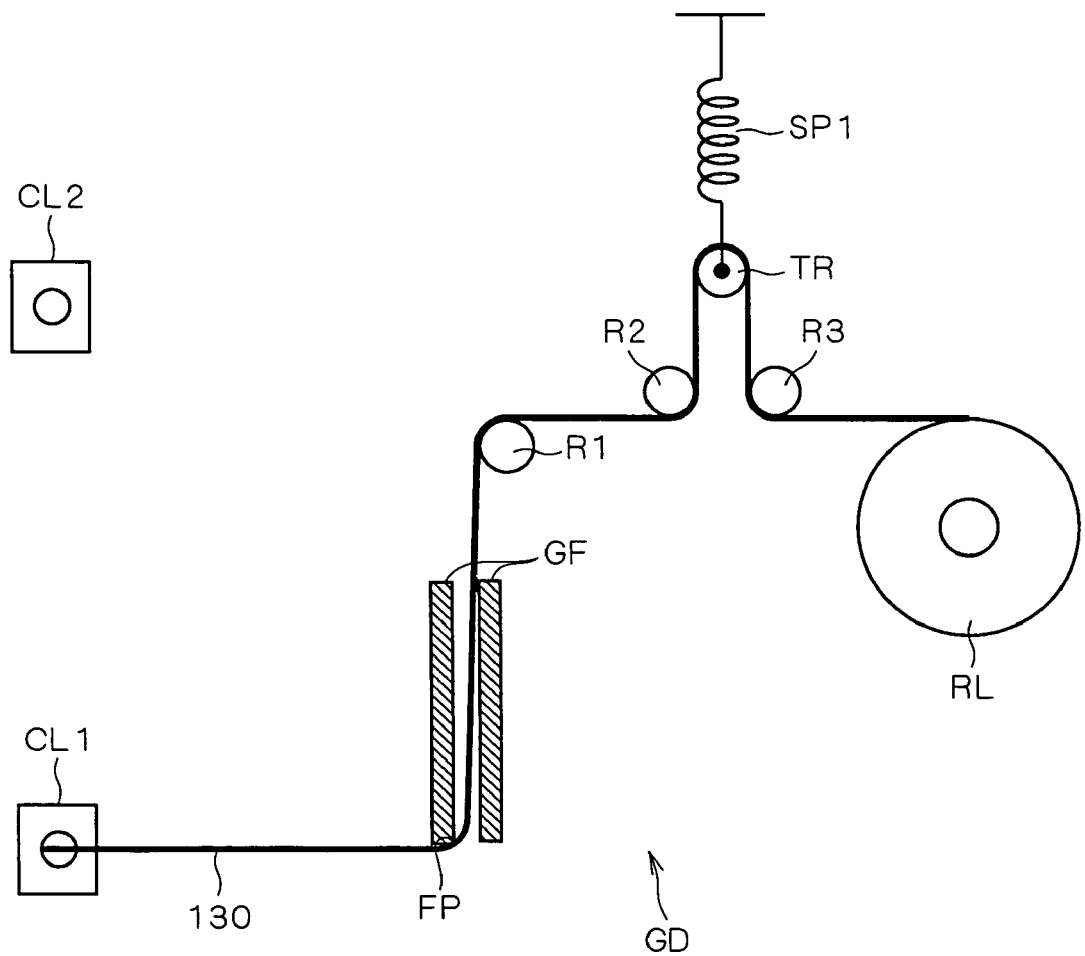
FIG. 6 is a diagram showing an outline structure of a unit for mounting SMA.

FIG. 6 shows an essential mechanical structure of the clamping/mounting unit 502. As shown in FIG. 6, the clamping/mounting unit 502 mainly includes a drawing roll RL, rolls R1 to R3, a tension roll TR, a tension-applying spring SP1, a guide tube GF, and first and second clamping members CL1, CL2.

The drawing roll RL with the SMA 130 wound therearound is arranged freely pivotable with respect to the body of the manufacturing system 500. By rotation of the drawing roll RL with respect to the body of the manufacturing system 500, the SMA wire 130 is drawn out of the drawing roll RL.

The SMA wire 130 drawn out of the drawing roll RL is hooked over the roll R3, tension roll TR, roll R2 and roll R1 in this order, and then passes through the hollow portion of the cylindrical guide tube GF, and the end of the SMA wire 130 is clamped by the first clamping member CL1. The path of the SMA wire 130 is bent sharply at an edge FP of the hollow portion of the guide tube GF, and receives friction at a contact with the edge FP. The tension roll TR is pulled up by the tension-applying spring SP1 by a predetermined force to maintain the SMA wire 130 between the first clamping member CL1 and drawing roll RL with a certain degree of tension being applied thereto.

The position of the first clamping member CL1 is determined on the body of the manufacturing system 500 with a certain degree of tension being applied to the SMA wire 130 as described, while the drawing roll RL, rolls R1 to R3, tension roll TR, tension-applying spring SP1 and guide tube GF move along the mounting path together so that part of the SMA wire 130 most lately drawn out of the guide tube GF is clamped by the second clamping member CL2. The SMA wire 130 is thereby mounted along the mounting path. Hereinafter, the drawing roll RL, rolls R1 to R3, tension roll TR, tension-applying spring SP1 and guide tube GF will be integrally called "a mounting guide GD."

The current-applying unit 503 applies a potential difference between the first and second clamping members CL1 and CL2 in response to a signal from the control unit 501, to thereby apply current to the SMA wire 130 mounted between the first and second clamping members CL1 and CL2.

The tension-applying unit 504 applies a tensile force to each of the first and second clamping members CL1 and CL2 in response to a signal from the control unit 501, to thereby apply a predetermined reference tension (reference tension) to the SMA wire 130.

Figure 7:
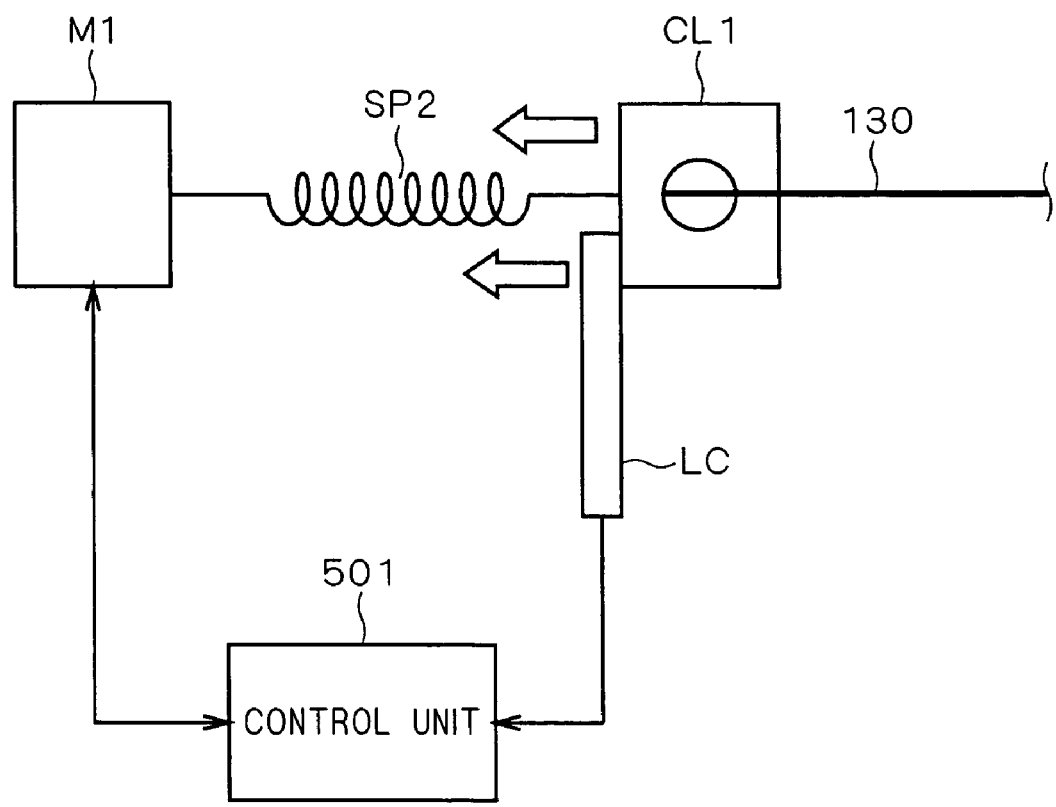
FIG. 7 is a diagram illustrating a technique for applying tensile stress to SMA.

FIG. 7 is a diagram illustrating a technique for adjusting the tensile force applied by the tension-applying unit 504 to each of the first and second clamping members CL1 and CL2. The structure of the first clamping member CL1 is illustrated in FIG. 7 as a representative example.

As shown in FIG. 7, when a pulse signal is given from the control unit 501 to a pulse motor M1, then, the pulse motor M1 pulls the first clamping member CL1 via a spring SP2. At this time, the first clamping member CL1 comes into contact with a load sensor (load cell) LC. Control can be exercised such that a predetermined tension (e.g., reference tension) is applied to the SMA wire 130 by monitoring a load applied to the load cell LC by the control unit 501. In this manner, employment of a structure in which the tension applied to the SMA wire 130 is detected and a target tension is applied to the SMA wire 130 according to the result of detection allows the tension applied to the SMA wire 130 to be accurately adjusted to a predetermined tension (e.g., reference tension).

The SMA fixing unit 505 fixes the SMA wire 130 by the first and second attaching members 111 and 112. For instance, a robot-type arm carries out swaging at the first and second attaching members 111 and 112.

Manufacturing Problems

When mounting the SMA wire 130 during the manufacture of the actuator 100, variations in tension applied to the SMA wire 130 (tension variations) occur depending on the position of the SMA wire 130. This is because friction produced at the edge FP varies according to the speed and direction of mounting when the SMA wire 130 is pulled out of the guide tube GF while receiving friction at the edge FP, as shown in FIG. 6.

Below austenite phase transformation temperatures, the SMA wire 130 produces extension according to the aforementioned tension variations. Elongation of the mounted SMA wire 130 is not stable due to the tension variations. Accordingly, fixing the SMA wire 130 to the actuator body in this state will cause tension remaining in the mounted SMA wire 130 to vary.

Variations in remaining tension cause unstable responsivity of the actuator 100. Further, the position of the to-be-driven object 5 (initial position) where the tensile force of the SMA wire 130 and the tensile force of the elastic-force applying member 140 on the to-be-driven object 5 are equalized is displaced.

To solve such problems, a manufacturing method to be described below is employed to relieve variations in remaining tension (tension variations) in the SMA wire 130 before fixing the SMA wire 130 to the actuator body, so that the responsivity of the actuator 100 is increased.

Manufacturing Method

FIG. 8 is a flow chart showing a manufacturing flow of the actuator 100. In this flow, steps S3 to S6 are carried out under control of the control unit 501. Steps S1 and S2 may be performed by operation of various mechanisms under control of the control unit 501, or may be carried out manually, or may be achieved by various mechanisms under control of another control unit. FIGS. 9A through 9E are diagrams illustrating exemplary steps of manufacturing method of the actuator 100.

Steps (S1 through S6) of the manufacturing method of the actuator 100 shown in FIG. 8 will be described below with reference to FIGS. 9A through 9E.

Figure 9A:
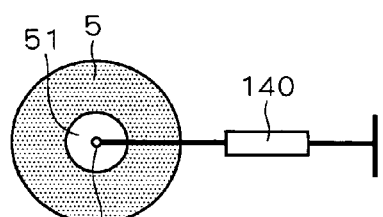
FIGS. 9A through 9E are diagrams each illustrating a step of manufacturing the actuator.

In step S1, as shown in FIG. 9A, the to-be-driven object 5 with the turning part 51 formed projectingly to which one end of the elastic-force applying member 140 is fixed by the attaching member 52 is prepared.

Figure 9B:
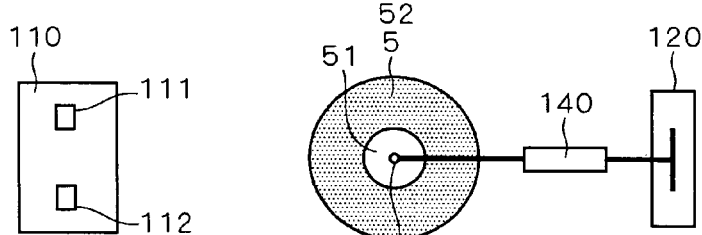

In step S2, as shown in FIG. 9B, the other end of the elastic-force applying member 140 on the opposite side to the to-be-driven object 5 is fixed to the second fixing member 120, so that the elastic-force applying member 140 is mounted between the to-be-driven object 5 and second fixing member 120.

Figure 9C:
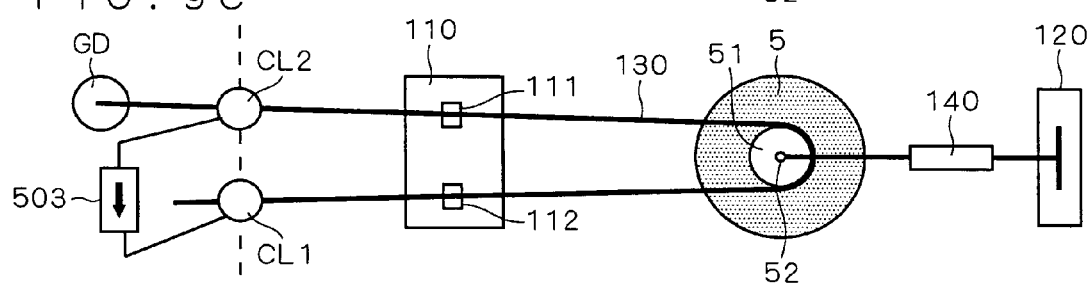

In step S3, as shown in FIG. 9C, the SMA wire 130 is mounted between the first fixing member 110 and to-be-driven object 5 by the action of the clamping/mounting unit 502. In other words, the SMA wire 130 is hooked over the turning part 51 under tension and is mounted between the first and second fixing members 110 and 120, that is, on the actuator body.

Figure 9D:
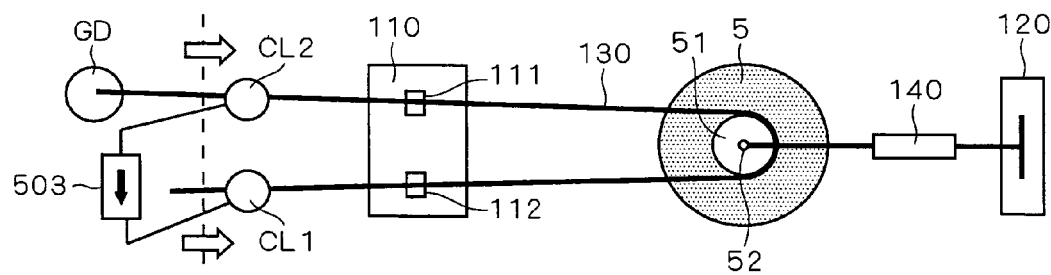

In step S4, as shown in FIG. 9D, a current is applied to the SMA wire 130 by the current-applying unit 503 with no tensile force being applied to the first and second clamping members CL1 and CL2, that is, with no tensile stress being applied to the SMA wire 130, to thereby heat the SMA wire 130. Here, the length of the SMA wire 130 is adjusted to a memorized length by heating the SMA wire 130 above austenite phase transformation temperatures, that is, a temperature range (austenite temperature range) in which the crystal structure of the SMA wire 130 is transformed into austenite. At this time, variations in remaining tension (tension variations) in the SMA wire 130 occurred at mounting are relieved.

Figure 9E:
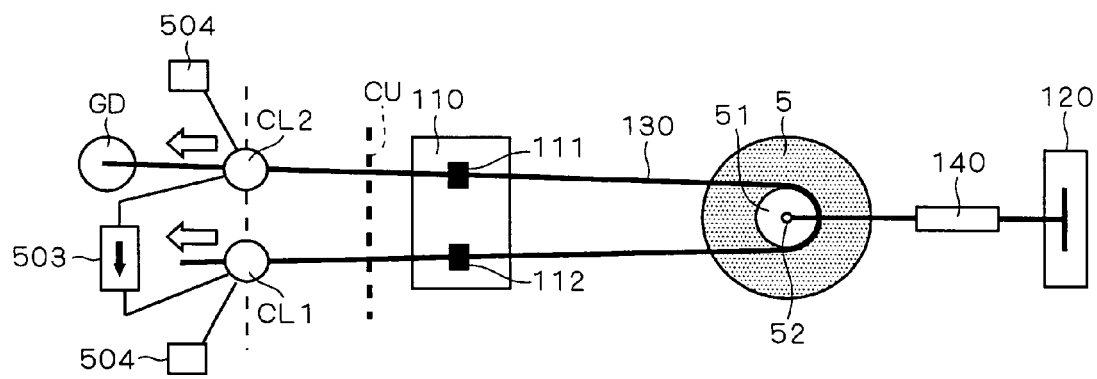

In step S5, as shown in FIG. 9E, the first and second clamping members CL1 and CL2 are pulled to the left in the drawing by the tension-applying unit 504, to thereby apply a predetermined tensile stress (reference tension) to the SMA wire 130.

Here, a predetermined tensile stress (reference tension) is previously applied to the SMA wire 130 by the tension-applying unit 504 so as to obtain prescribed responsivity before fixing the SMA wire 130 to the actuator body by the SMA fixing unit 505.

An excessive tension, when applied to the SMA wire 130, however, degrades the SMA wire 130 in durability, problematically causing the SMA wire 130 to break at extension/contraction. Accordingly, the tensile stress to be applied to the SMA wire 130 fixed to the actuator body is preferably adjusted to a prescribed value. Further, the tensile stress is preferably set at such a value that the SMA wire 130 does not undergo plastic deformation when returning to its memorized length.

In step S6, as shown in FIG. 9E, the SMA wire 130 with the predetermined reference tension applied thereto is swaged by the SMA fixing unit 505 using the first and second attaching members 111 and 112 to be fixed to the first fixing member 110. Then, the SMA wire 130 is cut in a position of bold broken line CU shown in FIG. 9E, to thereby complete the actuator 100.

As described, the actuator 100 according to the first preferred embodiment is manufactured by heating the SMA wire 130 mounted between the actuator body and to-be-driven object 5 up to the austenite temperature range and then attaching the SMA wire 130 to the actuator body. The manufacture with such technique can relieve tension variations that occur in the SMA wire 130 at mounting. This in result achieves stable responsivity of the actuator 100 and prevents the initial position of the to-be-driven object 5 where the tensile force of the SMA wire 130 and the tensile force of the elastic-force applying member 140 on the to-be-driven object 5 are equalized from being displaced.

Further, the relief of tension variations that occur in the SMA wire 130 at mounting allows precise application of a tensile stress (here, reference tension) to the SMA wire 130 when being fixed to the actuator body. This in result stabilizes the tension applied to the SMA wire 130 in the actuator 100, which stabilizes a heat source (here, current) for heating the SMA wire 130.

Second Preferred Embodiment

In the actuator 100 manufactured by the manufacturing method according to the above-described first preferred embodiment, the tensile stress on the SMA wire 130 adjusted to a predetermined reference tension problematically decreases in the initial actuation in which the SMA wire 130 extends and contracts.

Figure 10A:
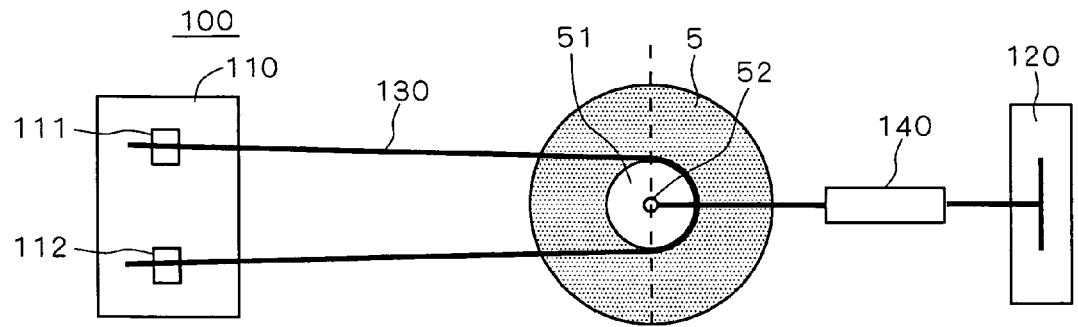
FIGS. 10A to 10C are diagrams each showing a displacement of a reference position caused by initial actuation.
Figure 10B:
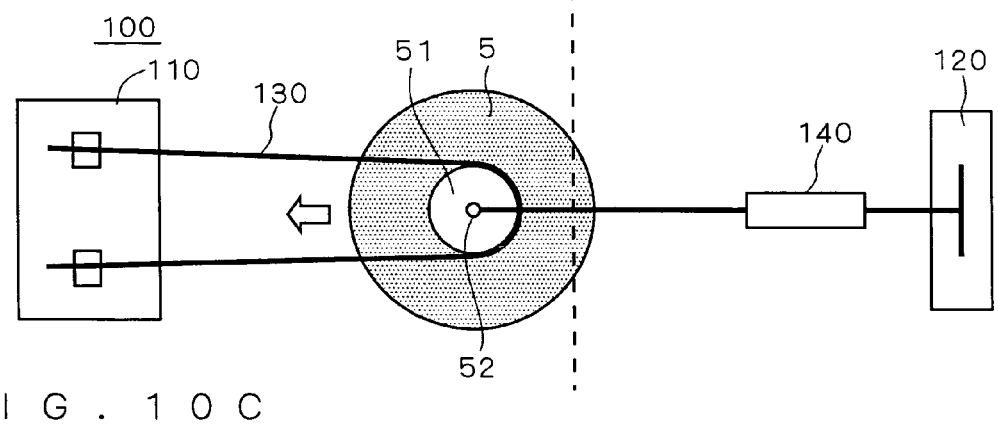
Figure 10C:
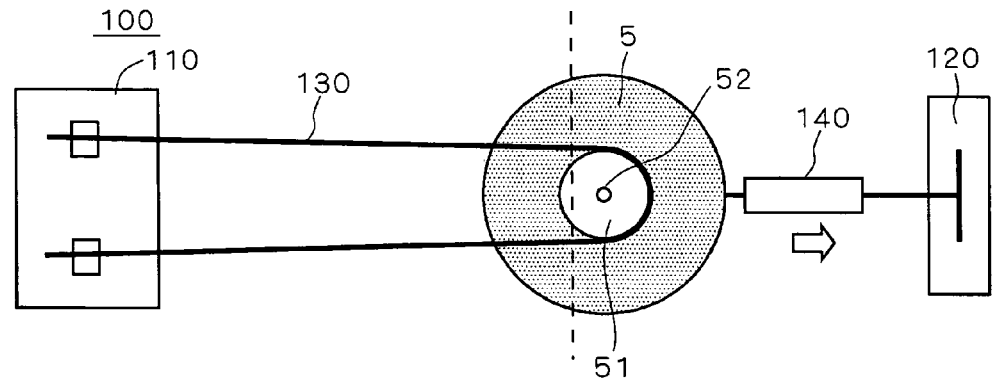

FIGS. 10A to 10C are diagrams showing the drawback of decrease in tensile stress on the SMA wire 130 adjusted to a predetermined reference tension in the initial actuation. For easy understanding of displacements of the to-be-driven object 5, FIGS. 10A to 10C contain a broken line in a reference position.

In the actuator 100 manufactured as shown in FIG. 10A, applying a current to the SMA wire 130 only at once for heating causes the SMA wire 130 to contract, so that the to-be-driven object 5 moves to the left in the drawing, as shown in FIG. 10B. Then, stopping the application of current to the SMA wire 130, the SMA wire 130 is cooled and pulled by the elastic-force applying member 140 to the right in the drawing to be elastically deformed. At this time, the tensile stress on the SMA wire 130 decreases so that the SMA wire 130 becomes slackened, which disturbs the equilibrium between the tensile force of the SMA wire 130 and the tensile force of the elastic-force applying member 140 on the to-be-driven object 5. Then, as shown in FIG. 10C, the initial position of the to-be-driven object 5 is displaced toward the elastic-force applying member 140.

An actuation distance for moving the to-be-driven object 5 as displaced toward the elastic-force applying member 140 as shown in FIG. 10C to a desired position on the left in the drawing is long, resulting in degraded responsivity.

Accordingly, the manufacturing method according to the present embodiment employs a method that prevents the tensile stress applied to the SMA wire 130 from being decreased below a reference tension, to thereby solve the problems in that (i) the actuator 100 is degraded in responsivity, (ii) the initial position of the to-be-driven object 5 is displaced and (iii) the SMA wire 130 becomes slackened.

A manufacturing system 500B and a manufacturing method of an actuator 100B according to the second preferred embodiment will be described below. Since the manufacturing system 500B is similar in structure to the manufacturing system 500 according to the first preferred embodiment, the description will be focused on the manufacturing method which is a difference between the manufacturing systems 500 and 500B.

Manufacturing Method

A tensile stress is applied to the SMA wire 130 in such a degree that the SMA wire 130 uniformly extends before being fixed to the actuator body in order to mount the SMA wire 130 in such a manner that the tensile stress on the SMA wire 130 does not decrease at the initial actuation of the SMA wire 130. More specifically, heating the SMA wire 130 up to the austenite temperature range to apply thereto a prescribed tensile stress (here, predetermined reference tension) causes the SMA wire 130 to uniformly extend. This in result remarkably suppresses tension reduction caused by the initial extension/contraction of the SMA wire 130.

FIG. 11 is a flow chart showing a manufacturing flow of the actuator 100B according to the present embodiment.

Since exemplary steps of the manufacturing method of the actuator 100B are almost similar to those shown in FIGS. 9A through 9E, steps (S11 through S17) of the manufacturing method of the actuator 100B shown in FIG. 11 will be described below with reference to FIGS. 9A through 9E.

First, in steps S11 to S13, similar operations to those of steps S1 to S3 in FIG. 8 are carried out.

In step S14, as shown in FIG. 9D, a current is applied to the SMA wire 130 by the current-applying unit 503 with no tensile force being applied to the first and second clamping members CL1 and CL2, that is, with no tensile stress being applied to the SMA wire 130. That is, heating of the SMA wire 130 is started. Here, the length of the SMA wire 130 is adjusted to a memorized length by heating the SMA wire 130 above austenite phase transformation temperatures, similarly to step S4 shown in FIG. 8. At this time, variations in remaining tension (tension variations) in the SMA wire 130 occurred at mounting are relieved.

In step S15, as shown in FIG. 9E, a prescribed tensile stress is applied to the SMA wire 130 by the tension-applying unit 504 while continuing heating the SMA wire 130 as started in step S14, that is, while maintaining the SMA wire 130 at the memorized length.

In step S16, the heating of the SMA wire 130 is finished, while the application of the prescribed tensile stress to the SMA wire 130 is continued.

In step S17, as shown in FIG. 9E, the SMA wire 130 with the prescribed tensile stress being applied thereto is swaged by the SMA fixing unit 505 using the first and second attaching members 111 and 112, to be fixed to the first fixing member 110. Then, the SMA wire 130 is cut in a position of bold broken line CU shown in FIG. 9E, to thereby complete the actuator 100.

SPECIFIC EXAMPLE

FIG. 12 is a diagram showing a specific example (experimental results) of changes in length (slack) of the SMA wire 130 before and after the initial extension/contraction of the SMA wire 130 in the actuator 100B manufactured by the aforementioned manufacturing method (solid line Ln1). In FIG. 12, the changes in length of the SMA wire 130 are shown by elongation [%] calculated by the following equation (1).

More specifically, let the length of the SMA wire 130 before the initial extension/contraction at cooling (martensitic length) be L1, the current length of the SMA wire 130 at cooling be Lx and the memorized length (austenitic length) of the SMA wire 130 be L0. Then, the elongation [%] is expressed by the following equation (1):

$$\text{Elongation [\%]} = \{(Lx-L1)/L0\} \times 100 \quad (1)$$

The horizontal axis of FIG. 12 indicates the passage of time from the left before and after the initial extension/contraction of the SMA wire 130, and the vertical axis indicates elongation [%]. FIG. 12 also shows a specific example (experimental results) of elongation [%] of the SMA wire 130 in the actuator 100 manufactured by the manufacturing method according to the first preferred embodiment (broken line Ln2).

As shown in FIG. 12, in the actuator 100 manufactured by the manufacturing method according to the first preferred embodiment, the elongation of the SMA wire 130 was increased by 0.23% by the initial extension/contraction.

In contrast, in the actuator 100B manufactured by the manufacturing method according to the present embodiment, the elongation of the SMA wire 130 was decreased by 0.02% by the initial extension/contraction, showing that the elongation changed little before and after the initial extension/contraction. This means that the tensile stress applied to the SMA wire 130 hardly varies before and after the initial extension/contraction.

As described, the actuator 100B according to the present embodiment is manufactured by heating the SMA wire 130 mounted on the actuator body with the prescribed tensile stress being applied thereto and then fixing the SMA wire 130 to the actuator body with the application of the prescribed tensile stress being maintained. The manufacture by such technique can relieve tension variations that occur in the SMA wire 130 at mounting before fixing the SMA wire 130 to the actuator body and can prevent the SMA wire 130 from becoming slackened by the initial extension/contraction. This in result prevents the initial position of the to-be-driven object 5 from being displaced, which in turn achieves improved responsivity of the actuator 100B.

Further, for instance, in a bias-spring type actuator such as the actuator 100B, the to-be-driven object 5 of the actuator 100B stops at a position where the tensile force of the SMA wire 130 and the tensile force of the elastic-force applying member 140 are equalized. In other words, the tensile stress applied to the SMA wire 130 is given by the elastic-force applying member 140. Accordingly, a force of the SMA wire 130 that overcomes the tensile force applied by the elastic-force applying member 140 needs to be produced to drive the actuator 100B.

The manufacturing method according to the present embodiment applies the prescribed tensile stress to the SMA wire 130 at heating, which increases the tensile force by the elastic-force applying member 140 in the actuator 100B with increasing tensile stress on the SMA wire 130. To drive the to-be-driven object 5 to a desired position, the SMA wire 130 needs to be heated to higher reaction temperatures such that the SMA wire 130 has a tensile force that overcomes the increased tensile force by the elastic-force applying member 140. Accordingly, the reaction temperature of the SMA wire 130 rises by applying a prescribed tension to the SMA wire 130 at heating. Appropriate selection of the prescribed tensile stress to be applied to the SMA wire 130 can therefore avoid an unnecessary action caused by the ambient temperature.

Further, according to the manufacturing method according to the present embodiment, the prescribed tensile stress is applied to the SMA wire 130 while heating before fixing the SMA wire 130 to the actuator body. In this manner, heating and applying the tensile stress are carried out at the same time, which prevents the manufacturing time of the actuator 100B from increasing.

Variant

The present invention is not limited to the above-described preferred embodiments.

In the second preferred embodiment, the prescribed tensile stress is applied to the SMA wire 130 after the start of heating of the SMA wire 130, and the SMA wire 130 is then fixed to the actuator body, which, however, is only an illustrative example. For instance, the actuator 100B may be manufactured by heating the SMA wire 130 after mounting the SMA wire 130 on the actuator body and after starting applying the prescribed tensile stress to the SMA wire 130, and then by fixing the SMA wire 130 to the actuator body. In other words, heating of the SMA wire 130 and applying the prescribed tensile stress to the SMA wire 130 may be changed in sequence. Such manufacturing method can be obtained by employing the manufacturing system 500B according to the second preferred embodiment. With such structure, similar effects to those of the second preferred embodiment can be achieved.

Figure 13:
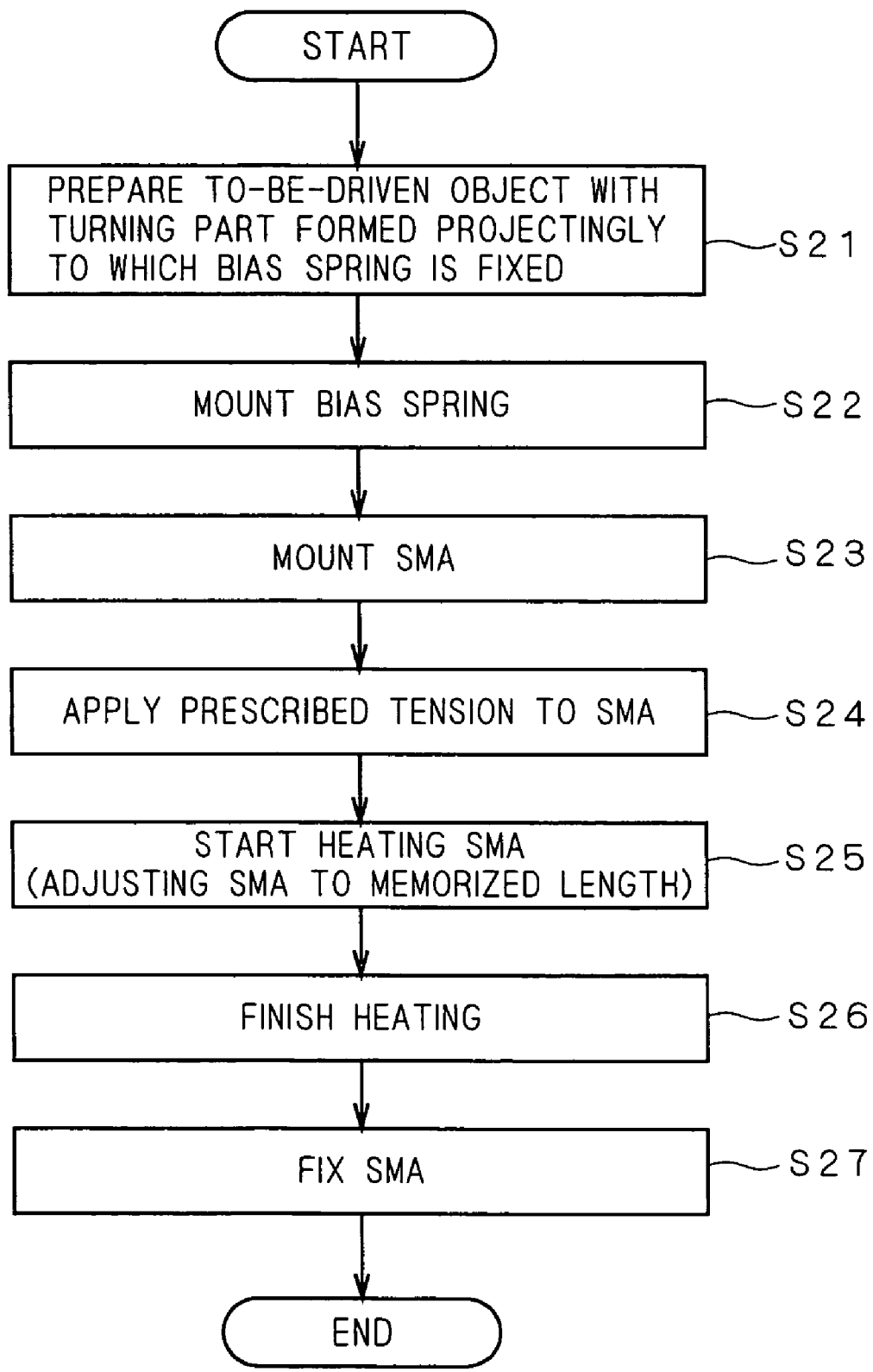
FIGS. 13 and 14 are flow charts each showing a manufacturing flow of an actuator according to a variant.

FIG. 13 is a flow chart showing a manufacturing flow of an actuator in which the application of the prescribed tensile stress to the SMA wire 130 is started before heating the SMA wire 130.

In steps S21 to S23, operations similar to those of steps S11 to S13 shown in FIG. 11 are carried out. Then, the prescribed tensile stress is applied to the SMA wire 130 mounted on the actuator body (step S24). Next, the SMA wire 130 is heated up to the austenite temperature range with the prescribed tensile stress being applied thereto (step S25), and heating is finished after a lapse of a predetermined time period (step S26). Further, the SMA wire 130 with the prescribed tensile stress being applied thereto is swaged using the first and second attaching members 111 and 112 to be fixed to the first fixing member 110 (step S27). At this time, the SMA wire 130 is cut in a position between the first clamping member CL1 and second attaching member 112 and between the second clamping member CL2 and first attaching member 111, to thereby complete the actuator 100B.

The SMA wire 130 may be fixed to the first fixing member 110 with a tensile stress determined by considering a decrease in tensile stress on the SMA wire 130 caused by the initial extension/contraction being applied to the SMA wire 130. Such manufacturing method can be obtained by employing the manufacturing system 500B according to the second preferred embodiment. With such structure, similar effects to those of the second preferred embodiment can be achieved.

Figure 14:
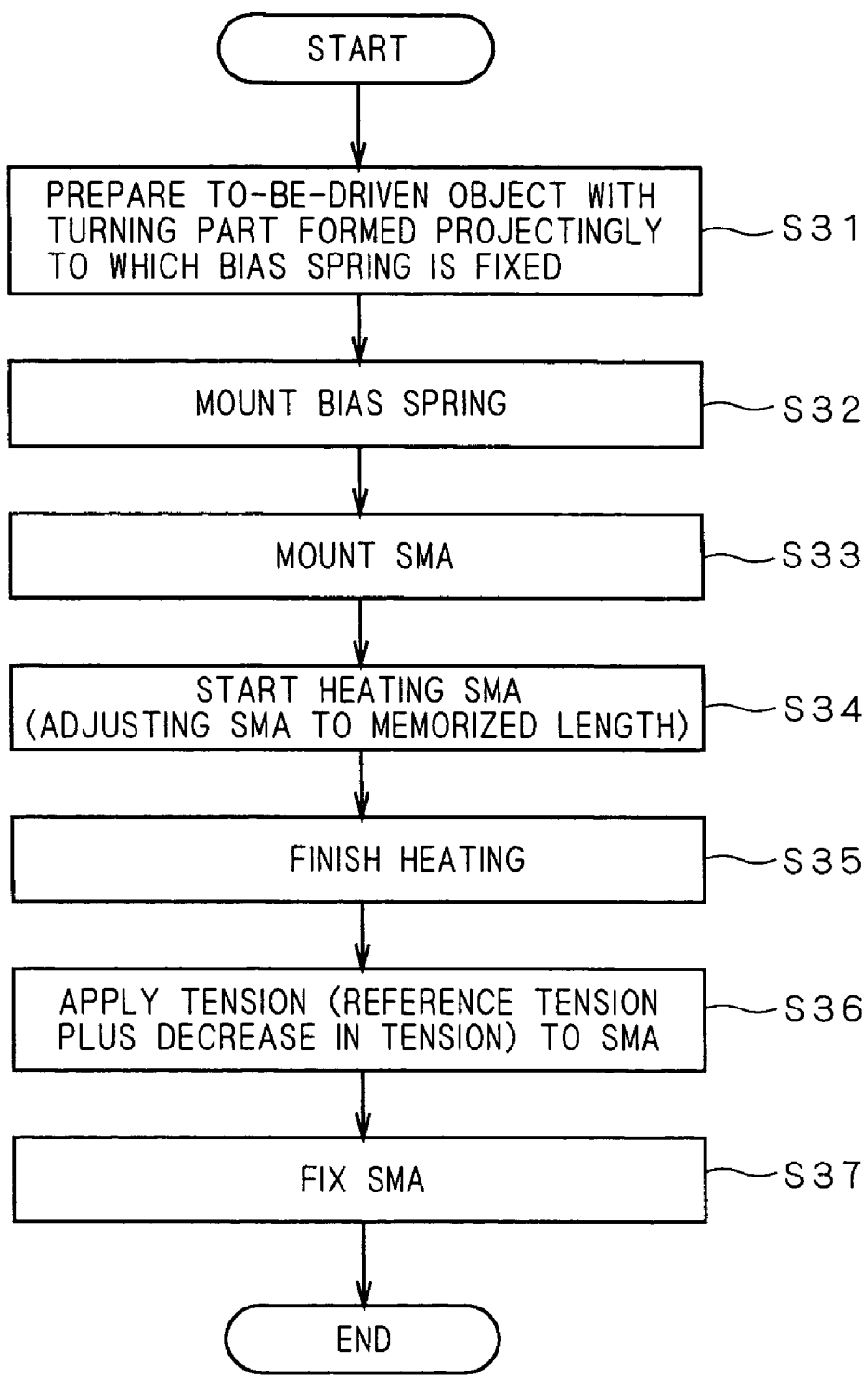

FIG. 14 is a flow chart showing a manufacturing flow of an actuator in which the SMA wire 130 is fixed to the first fixing member 110 with a tensile stress determined by considering a decrease in tensile stress on the SMA wire 130 caused by the initial extension/contraction being applied to the SMA wire 130.

In steps S31 to S34, operations similar to those of steps S11 to S14 shown in FIG. 11 are carried out.

In step S35, the heating of the SMA wire 130 is finished.

In step S36, a prescribed tensile stress is applied to the SMA wire 130. Here, the prescribed tensile stress is a tension determined by adding a predetermined tension corresponding to a decrease in tensile stress on the SMA wire 130 caused by the initial extension/contraction actuation to a reference tension that places the to-be-driven object 5 in the initial position determined in design with the SMA wire 130 having being cooled after the initial extension/contraction actuation after completing the actuator.

In step S37, the SMA wire 130 with the prescribed tensile stress being applied thereto is swaged using the first and second attaching members 111 and 112 to be fixed to the first fixing member 110. At this time, the SMA wire 130 is cut in a position between the first clamping member CL1 and second attaching member 112 and between the second clamping member CL2 and first attaching member 111, to thereby complete the actuator 100B.

As described, a tensile stress with a decrease in tensile stress to be caused by the initial extension/contraction actuation of the SMA wire 130 being added previously is applied to the SMA wire 130 to be fixed to the actuator body, so that a desired tensile stress is applied to the SMA wire 130 after the initial extension/contraction actuation. That is, the SMA wire 130 can be prevented from becoming slackened by the initial extension/contraction.

In the above preferred embodiments, the SMA wire 130 is heated up to the austenite temperature range after mounting the SMA wire 130 on the actuator body, which, however, is only an illustrative example. Tension variations that occur in the SMA wire 130 at mounting the SMA wire 130 may be relieved by heating part of the SMA wire 130 disposed on the mounting path, that is, part by which the mounting path is determined, while mounting the SMA wire 130 on the actuator body.

In the above preferred embodiments, as shown in FIG. 7, control is exercised to apply a desired tension (e.g., reference tension) to the SMA wire 130 by monitoring the load applied to the load cell LC included in the tension-applying unit 504 by the control unit 501, which, however, is only an illustrative example. As shown in FIGS. 15 and 16, the tension-applying unit 504 may be provided with springs 50a and 50b to apply resilient forces corresponding to spring constants of the springs 50a and 50b to the first and second clamping members CL1 and CL2, respectively, so that a desired tension (e.g., prescribed tensile stress) is applied to the SMA wire 130. With such structure, the tension to be applied to the SMA wire 130 can be adjusted accurately to a desired tension (e.g., prescribed tensile stress).

Further, as shown in FIGS. 17 and 18A to 18C, the tension-applying unit 504 may be provided with electromagnets 50c and 50d, and the first and second clamping members CL1 and CL2 may be made of a material that is attracted by magnets to appropriately adjust a force/distance by/for which the first clamping member CL1 is attracted by the electromagnet 50c and a force/distance by/for which the second clamping member CL2 is attracted by the electromagnet 50d, so that a desired tension is applied to the SMA wire 130.

Figure 18A:
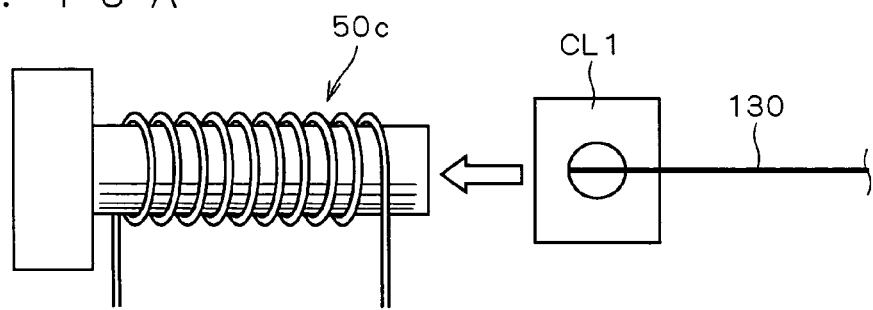
Figure 18B:
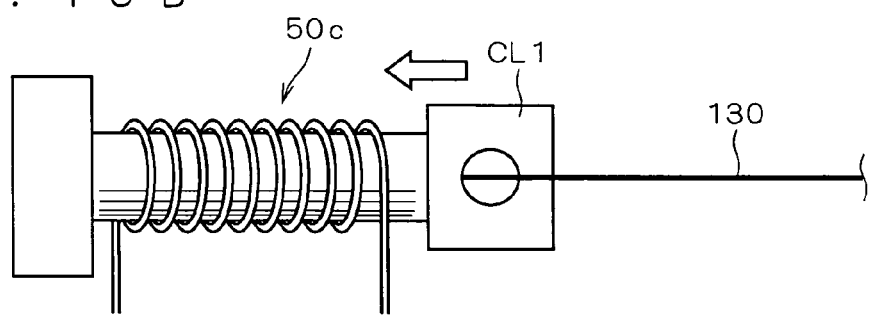
Figure 18C:
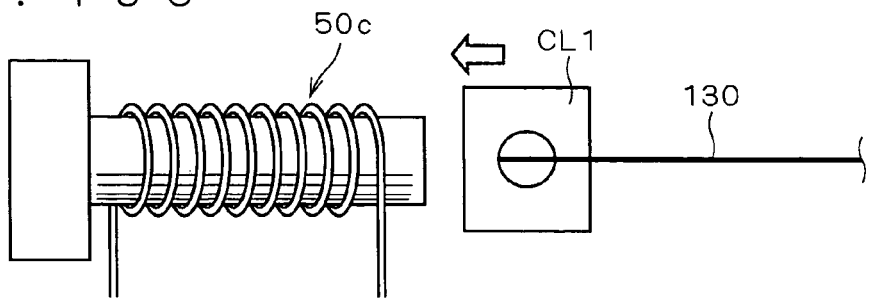

For instance, the first clamping member CL1 as shown in FIG. 18A is attracted by the electromagnet 50c to be moved for a predetermined distance as shown in FIG. 18B, so that a desired tension can be applied to the SMA wire 130. Alternatively, for instance, the first clamping member CL1 as shown in FIG. 18A may be pulled to a position where the force that the electromagnet 50c pulls the first clamping member CL1 and the tensile stress applied to the SMA wire 130 are equalized as shown in FIG. 18C, so that a desired tension is applied to the SMA wire 130.

With such structure, the tension to be applied to the SMA wire 130 can be adjusted accurately to a desired tension (e.g., prescribed tensile stress). Particularly, the technique using the electromagnets allows non-contacting application of a tensile stress to the SMA wire 130.

The aforementioned electromagnets 50c and 50d may be replaced with another type of magnet such as a simple permanent magnet.

Figure 19:
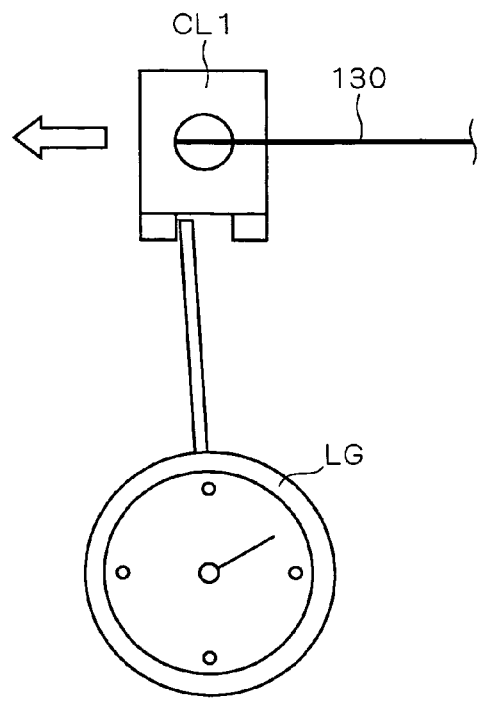

Further, as shown in FIG. 19, a load gauge LG may be used to monitor the tensile stress applied to the SMA wire 130.

Figure 20:
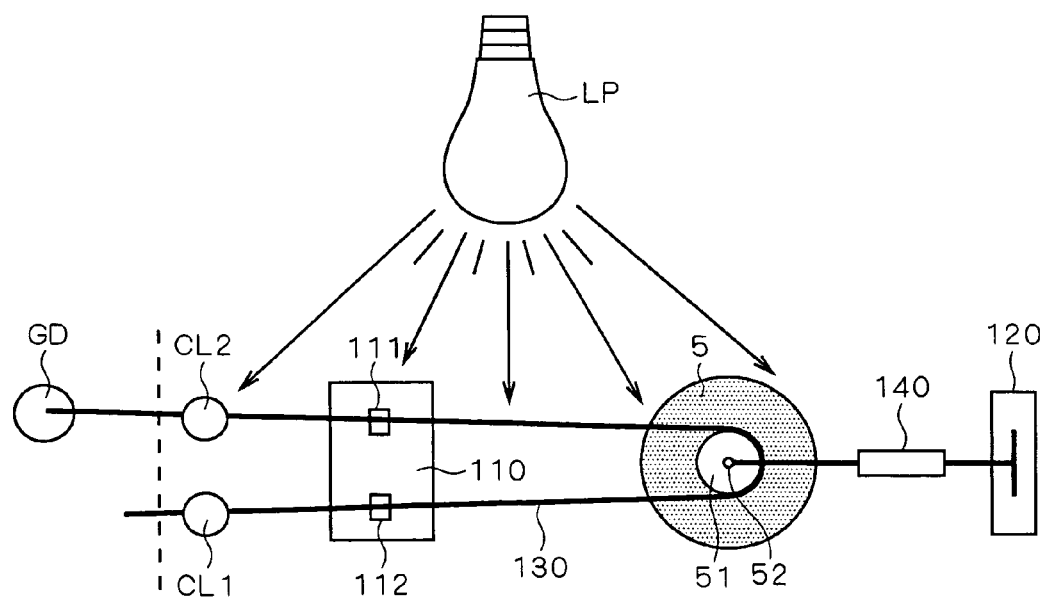
FIGS. 20 and 21 are diagrams each showing a variation of the method of heating SMA.
Figure 21:
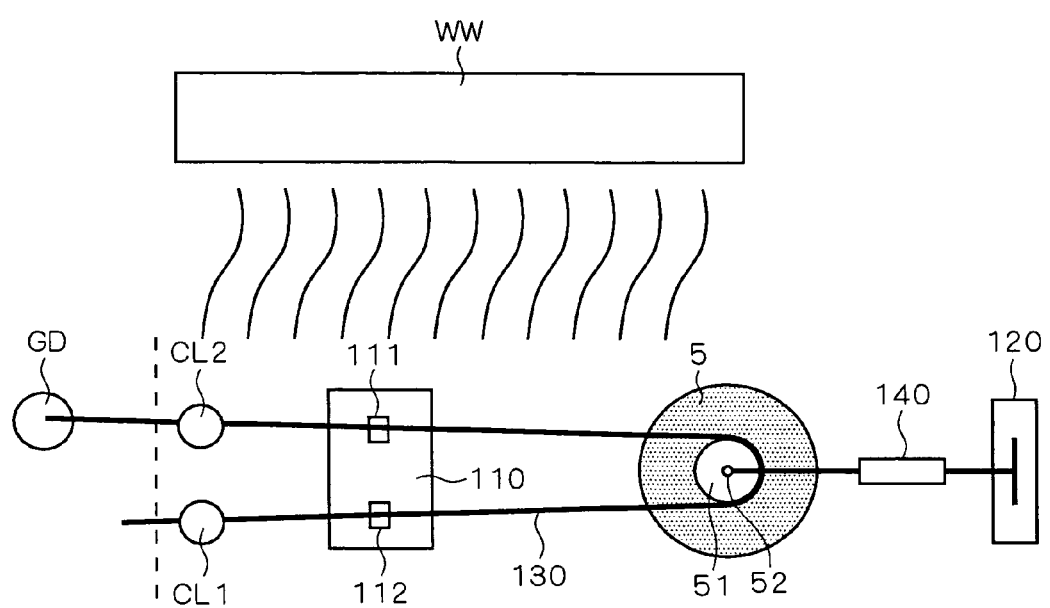

In the above preferred embodiments, the SMA wire 130 is electrically heated, which, however, is only an illustrative example. For instance, as shown in FIG. 20, the SMA wire 130 may be heated by a lamp LP, or by hot air from a hot air generator WW as shown in FIG. 21.

From the viewpoint of heating the SMA wire 130 uniformly, however, it is preferable that the SMA wire 130 be heated by electric heating as described in the above preferred embodiments.

In the above preferred embodiments, the actuators 100 and 100B are bias-spring type actuators, which, however, is only an illustrative example. The present invention is also applicable to what is called a push-pull actuator.

Figure 22A:
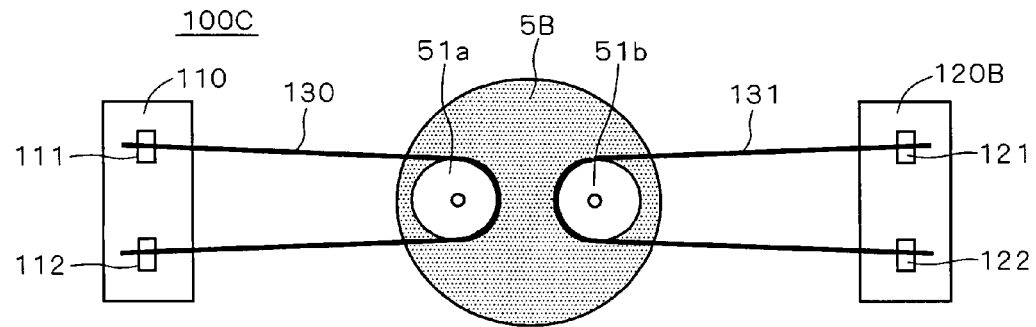
FIGS. 22A to 22C are plan views each showing an outline structure of a push-pull actuator.
Figure 22B:
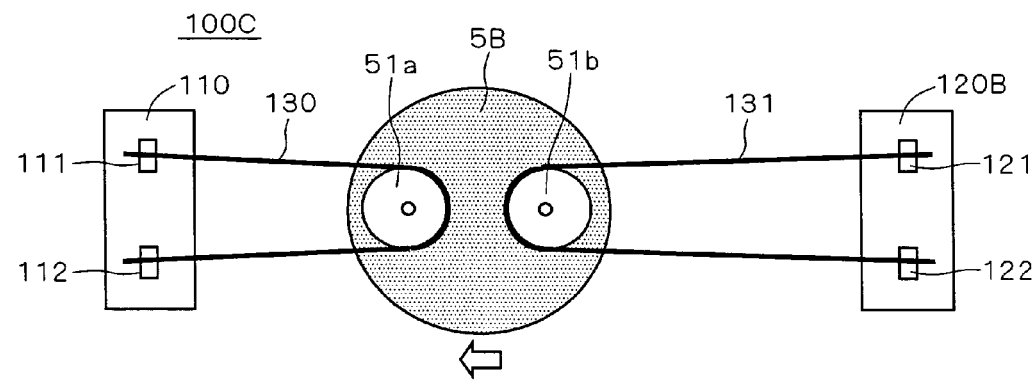
Figure 22C:
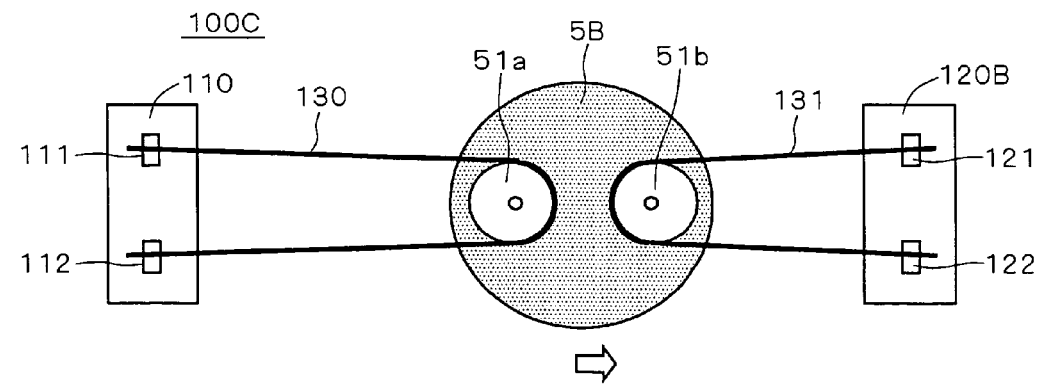

FIGS. 22A to 22C are plan views each showing an outline structure of a push-pull actuator 100C for driving a to-be-driven object 5B with the help of extension/contraction of two SMA wires 130 and 131. Since the push-pull actuator 100C is similar in most part to the actuators 100 and 100B according to the first and second preferred embodiments, similar components are denoted by the same reference characters, and repeated explanation will be omitted as appropriate.

The actuator 100C will be described below focusing attention mainly to differences from the actuators 100 and 100B according to the first and second preferred embodiments.

In the actuator 100C, a second fixing member 120B is provided to fix the SMA wire 131, as shown in FIGS. 22A to 22C. The to-be-driven object 5B is provided with a first turning part 51*a* on the side closer to the first fixing member 110 and a second turning part 51*b* on the side closer to the second fixing member 120B.

The SMA wire 130 is mounted between the first fixing member 110 and to-be-driven object 5 while being hooked over the first turning part 51*a*. The SMA wire 131 is mounted between the second fixing member 120B and to-be-driven object 5 while being hooked over the second turning part 51*b*. The SMA wire 131 is fixed to the second fixing member 120B using a third attaching member 121 and a fourth attaching member 122 by swaging, press fitting or the like.

Here, the SMA wires 130 and 131 are equal in material, and act tensile forces on each other via the to-be-driven object 5B.

The actuation by the actuator 100C makes use of high and low states of elastic modulus of the SMA wires 130 and 131, and is carried out such that the elastic moduli of the two SMA wires 130 and 131 are not in the same state. More specifically, the actuation is carried out such that, when the elastic modulus of the SMA wire 130 is in the high state, the elastic modulus of the SMA wire 131 is in the low state, and vice versa.

With reference to FIGS. 22A to 22C, the actuation by the actuator 100C will be described below.

As shown in FIG. 22A, the two SMA wires 130 and 131 are held in engagement with the to-be-driven object 5B, both being slightly extended with a predetermined tension being applied thereto with their elastic moduli being in the low state. At this time, a current is applied to the SMA wire 130 from the first fixing member 110. The current may be flown in either direction.

The SMA wire 130 with the current being applied produces Joule heat by its own resistivity, so that its elastic modulus is brought into the high state. Accordingly, the SMA wire 130 generates a tensile force that pulls the to-be-driven object 5B toward the first fixing member 110. At this time, the SMA wire 131 with no current being applied has a low elastic modulus, and is extended under the influence of the tensile force applied to the to-be-driven object 5B by the SMA wire 130. As a result, as shown in FIG. 22B, the to-be-driven object 5B moves to the left indicated by an arrow in the drawing (toward the first fixing member 110).

Next, the application of current to the SMA wire 130 is stopped, and a current is now applied to the SMA wire 131 from the second fixing member 120B. The current may be flown in either direction.

The SMA wire 131 with the current being applied produces Joule heat by its own resistivity, so that its elastic modulus is brought into the high state. Accordingly, the SMA wire 131 generates a tensile force that pulls the to-be-driven object 5B toward the second fixing member 120B. At this time, the SMA wire 130 with no current being applied has a low elastic modulus, and is extended under the influence of the tensile force applied to the to-be-driven object 5B by the SMA wire 131. As a result, as shown in FIG. 22C, the to-be-driven object 5B moves to the right indicated by an arrow in the drawing (toward the second fixing member 120B).

In this manner, the actuation of driving the to-be-driven object 5B to the left and right as shown in FIGS. 22B and 22C is repeated as appropriate making use of extension/contraction of the SMA wires 130 and 131 caused by heating and cooling, so that the actuator 100C fulfils its function.

Such push-pull actuator 100C has two SMA wires 130 and 131 provided, but can be manufactured by mounting and fixing the SMA wires 130 and 131 on and to the actuator body by the technique similar to that of the second preferred embodiment. That is, the actuator 100C can be manufactured with a manufacturing system including the control unit 501, clamping/mounting unit 502, current-applying unit 503, tension-applying unit 504 and SMA fixing unit 505 shown in FIG. 5 for mounting and fixing each of the SMA wires 130 and 131.

Figure 23:
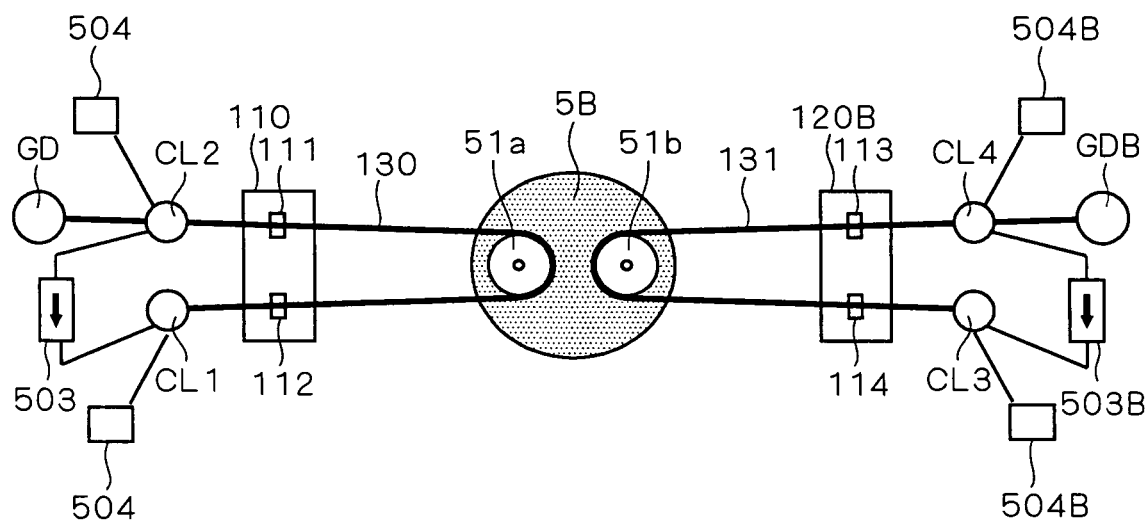
FIG. 23 is a diagram illustrating a manufacturing step of the push-pull actuator.
Figure 24:
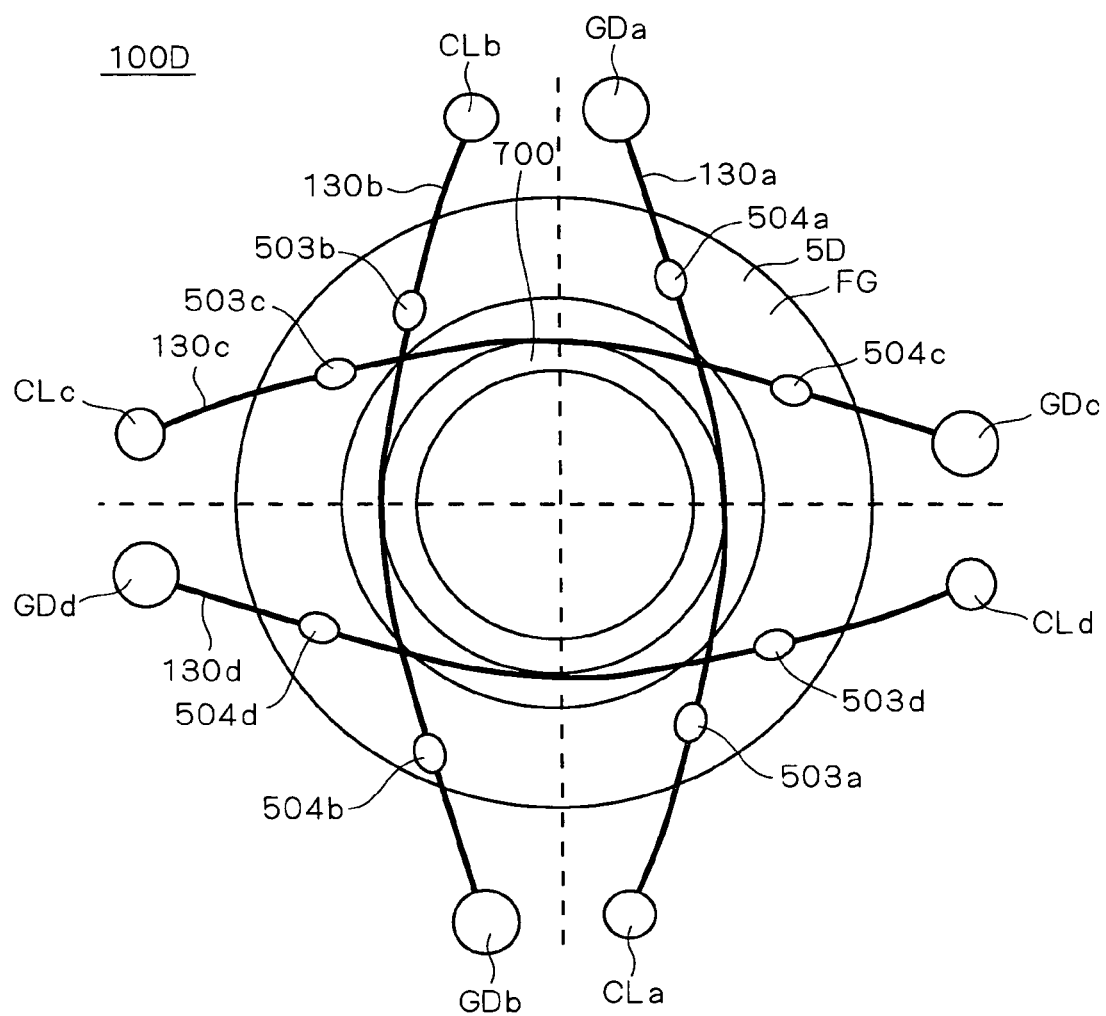
FIG. 24 is a plan view showing an outline structure of an actuator according to a variant.

As shown in FIG. 23, the SMA wire 130 is mounted between the to-be-driven object 5B and first fixing member 110 by the mounting guide GD, while the SMA wire 131 is mounted between the to-be-driven object 5B and second fixing member 120B by a mounting guide GDB.

Then, the first and second clamping members CL1 and CL2 are pulled by the tension-applying unit 504, to thereby apply a tensile stress to the SMA wire 130 as appropriate. A current is applied to the SMA wire 130 by the current-applying unit 503, to thereby heat the SMA wire 130. On the other hand, third and fourth clamping members CL3 and CL4 are pulled by a tension-applying unit 504B, to thereby apply a tensile stress to the SMA wire 131 as appropriate. A current is applied to the SMA wire 131 by a current-applying unit 503B, to thereby heat the SMA wire 131.

Mounting, heating and application of tensile stress may be executed on the SMA wires 130 and 131 concurrently by the manufacturing flow shown in FIG. 11, for example.

The present invention may be applied to the manufacture of an actuator 100D for driving a to-be-driven object 5D making use of extension/contraction of four SMA wires 130*a* to 130*d* hooked at positions different from one another on a circumferential surface of a cylinder 700 of the to-be-driven object 5D holding a lens element and the like.

In the manufacture of the actuator 100D, one ends of the SMA wires 130*a* to 130*d* are first clamped by clamping members CLa to CLd, respectively, and are mounted by mounting guides GDa to GDd on the to-be-driven object 5D, respectively. Then, a desired tensile stress is applied to the SMA wires 130*a* to 130*d* by tension applying units 504*a* to 504*d*, respectively. Further, a potential difference is given between the clamping members CLa to CLd and current-applying units 503*a* to 503*d*, respectively, by the current-applying units 503*a* to 503*d*, so that a desired current can be applied to each of the SMA wires 130*a* to 130*d*.

Mounting, heating and application of tensile stress may be executed on the SMA wires 130*a* to 130*d* concurrently by the manufacturing flow shown in FIG. 11, for example.

In the above preferred embodiments, the SMA wire 130 is in the shape of wire, which, however, is only an illustrative example. It may be of another shape such as strip, foil or the like.

While the invention has been shown and described in detail, the foregoing description is in all aspects illustrative and not restrictive. It is therefore understood that numerous modifications and variations can be devised without departing from the scope of the invention.

What is claimed is:

1. A system for manufacturing an actuator for driving a to-be-driven object by extension/contraction of a shape memory alloy, said system comprising:

a mounting unit configured to mount said shape memory alloy between an actuator body and said to-be-driven object;

a heater configured to heat said shape memory alloy mounted by said mounting unit on a mounting path between said actuator body and said to-be-driven object to a predetermined temperature range;

a tension-applying unit configured to apply a prescribed tension to said shape memory alloy mounted by said mounting unit; and an attaching unit configured to attach said shape memory alloy mounted by said mounting unit to said actuator body, wherein said heater is configured to heat said shape memory alloy to said predetermined temperature range before said tension is applied to said shape memory alloy by said tension-applying unit, and said attaching unit is configured to attach said shape memory alloy to said actuator body with said prescribed tension being applied to said shape memory alloy by said tension-applying unit.

2. A system for manufacturing an actuator for driving a to-be-driven object by extension/contraction of a shape memory alloy, said system comprising:

a mounting unit configured to mount said shape memory alloy between an actuator body and said to-be-driven object;

a heater configured to heat said shape memory alloy mounted by said mounting unit to a predetermined temperature range, said heater being configured to heat said shape memory alloy to said temperature range before said shape memory alloy is attached to said actuator body;

a tension-applying unit configured to apply a tension to said shape memory alloy mounted by said mounting unit; and an attaching unit configured to attach said shape memory alloy mounted by said mounting unit to said actuator body, wherein said tension-applying unit is configured to apply a prescribed tension to said shape memory alloy after said shape memory alloy is heated to said predetermined temperature range by said heater, said prescribed tension being determined by adding a predetermined tension corresponding to a decrease in tension applied to said shape memory alloy caused by an initial extension/contraction actuation of said shape memory alloy in said actuator to a reference tension determined in design applied to said shape memory alloy in said actuator, and said attaching unit is configured to attach said shape memory alloy to said actuator body with said prescribed tension being applied to said shape memory alloy by said tension-applying unit.

3. The system according to claim 1, further comprising:

a tension-detecting unit configured to detect the tension applied to said shape memory alloy by said tension-applying unit; and a tension-adjusting unit configured to adjust the tension applied to said shape memory alloy by said tension-applying unit to said prescribed tension in accordance with the result of detection by said tension-detecting unit.

4. The system according to claim 1, wherein said tension-applying unit is configured to pull said shape memory alloy for a predetermined distance to thereby apply said prescribed tension to said shape memory alloy.

5. The system according to claim 1, wherein said tension-applying unit includes a spring, and is configured to apply said prescribed tension to said shape memory alloy utilizing an elastic force corresponding to a spring constant of said spring.

6. The system according to claim 1, wherein said tension-applying unit includes one of an electromagnet and a permanent magnet producing a predetermined magnetic force and applies said prescribed tension to said shape memory alloy by said predetermined magnetic force.

7. The system according to claim 1, wherein said predetermined temperature range is a temperature range where a crystal structure of said shape memory alloy is transformed into austenite.

8. The system according to claim 1, wherein said heater is configured to apply a current to said shape memory alloy to thereby heat said shape memory alloy.

9. A method of manufacturing an actuator for driving a to-be-driven object by extension/contraction of a shape memory alloy, said method comprising the steps of:

(a) mounting said shape memory alloy on a mounting path between an actuator body and said to-be-driven object;

(b) heating said shape memory alloy mounted on said mounting path in said step (a) to a predetermined temperature range;

(c) while said shape memory alloy is heated to said predetermined temperature range in said step (b), applying a prescribed tension to said shape memory alloy; and (d) attaching said shape memory alloy to said actuator body with said prescribed tension being applied to said shape memory alloy.

10. A method of manufacturing an actuator for driving a to-be-driven object by extension/contraction of a shape memory alloy, said method comprising the steps of:

(a) mounting said shape memory alloy on a mounting path between an actuator body and said to-be-driven object;

(b) heating said shape memory alloy mounted on said mounting path in said step (a) to a predetermined temperature range;

(c) while said shape memory alloy is heated to said predetermined temperature range in said step (b), attaching said shape memory alloy to said actuator body with a prescribed tension being applied to said shape memory alloy, said prescribed tension being determined by adding a predetermined tension corresponding to a decrease in tension applied to said shape memory alloy caused by an initial extension/contraction actuation of said shape memory alloy in said actuator to a reference tension determined in design applied to said shape memory alloy in said actuator.

11. The method according to claim 9, wherein in said steps (c) and (d), a tension applied to said shape memory alloy is adjusted to said prescribed tension in accordance with the result of detection of the tension applied to said shape memory alloy.

12. The method according to claim 9, wherein in said steps (c) and (d), said shape memory alloy is pulled for a predetermined distance to thereby apply said prescribed tension to said shape memory alloy.

13. The method according to claim 9, wherein in said steps (c) and (d), said prescribed tension is applied to said shape memory alloy utilizing an elastic force corresponding to a spring constant of a spring.

14. The method according to claim 9, wherein in said steps (c) and (d), said prescribed tension is applied to said shape memory alloy by a predetermined magnetic force produced by one of an electromagnet and a permanent magnet.

15. The method according to claim 9, wherein said predetermined temperature range is a temperature range where a crystal structure of said shape memory alloy is transformed into austenite.

16. The method according to claim 9, wherein
in said step (b), a current is applied to said shape memory alloy to thereby heat said shape memory alloy.

17. The system according to claim 1, further comprising:
a control unit configured to control the operation of each of said mounting unit, said heater, and said tension-applying unit.

18. The system according to claim 17, wherein
said mounting unit is configured to mount said shape memory alloy in response to a signal from said control unit.

19. The system according to claim 18, wherein
said tension-applying unit is configured to apply said prescribed tension to said shape memory alloy in response to a signal from said control unit.

20. The system according to claim 19, wherein
said heater is configured to heat said shape memory alloy in response to a signal from said control unit in order to bring said shape memory alloy to a temperature range in which the crystal structure of said shape memory alloy is transformed into austenite.

21. The system according to claim 20, wherein
said attaching unit is configured to attach said shape memory alloy to said actuator body in response to a signal from said control unit while the crystal structure of said shape memory alloy is transformed into austenite and while said prescribed tension is applied to said shape memory alloy.

22. The system according to claim 1, wherein
said attaching unit is configured to attach said shape memory alloy to said actuator body at a position between said tension-applying unit and said to-be-driven object.

23. The system according to claim 1, further comprising:
a clamping member configured to clamp said shape memory alloy, wherein said tension-applying unit is configured to apply a tensile force to said clamping member to thereby apply said prescribed tension to said shape memory alloy.

24. A system for manufacturing an actuator for driving a to-be-driven object by extension/contraction of a shape memory alloy, said system comprising:
a control unit;
a mounting unit configured to mount said shape memory alloy along a mounting path between an actuator body and said to-be-driven object in response to a signal from said control unit;
a heater configured to heat said shape memory alloy mounted by said mounting unit in response to a signal from said control unit in order to bring said shape memory alloy to a temperature range in which the crystal structure of said shape memory alloy is transformed into austenite;
a tension-applying unit configured to apply a prescribed tension to said shape memory alloy mounted by said mounting unit in response to a signal from said control unit while the crystal structure of said shape memory alloy is transformed into austenite; and
an attaching unit configured to attach said shape memory alloy to said actuator body in response to a signal from said control unit while the crystal structure of said shape memory alloy is transformed into austenite and while said prescribed tension is applied to said shape memory alloy.

* * * * *